United States Patent
Kim et al.

(10) Patent No.: US 9,811,934 B2
(45) Date of Patent: Nov. 7, 2017

(54) MOBILE TERMINAL AND CONTROL METHOD FOR THE MOBILE TERMINAL

(71) Applicant: LG ELECTRONICS INC., Seoul (KR)

(72) Inventors: Minchul Kim, Seoul (KR); Jeonghyun Lee, Seoul (KR); Kyungmin Cho, Seoul (KR); Jaemoo Lee, Seoul (KR); Jongkyeong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/021,228

(22) PCT Filed: Feb. 5, 2014

(86) PCT No.: PCT/KR2014/000975
§ 371 (c)(1),
(2) Date: Mar. 10, 2016

(87) PCT Pub. No.: WO2015/037794
PCT Pub. Date: Mar. 19, 2015

(65) Prior Publication Data
US 2016/0225175 A1    Aug. 4, 2016

(30) Foreign Application Priority Data
Sep. 16, 2013 (KR) ........................ 10-2013-0111286

(51) Int. Cl.
*H04N 5/262*    (2006.01)
*G06T 11/60*    (2006.01)
(Continued)

(52) U.S. Cl.
CPC .............. *G06T 11/60* (2013.01); *G06F 3/013* (2013.01); *G06F 3/0488* (2013.01);
(Continued)

(58) Field of Classification Search
None
See application file for complete search history.

(56) References Cited

U.S. PATENT DOCUMENTS

2010/0097443 A1*   4/2010   Lablans ................. G03B 37/00
                                                   348/36
2011/0182512 A1*   7/2011   Nishi ................... G11B 27/105
                                                   382/173
(Continued)

FOREIGN PATENT DOCUMENTS

JP       2013-140327       7/2013
KR    10-2006-0014228    2/2006
(Continued)

*Primary Examiner* — Stephen Coleman
(74) *Attorney, Agent, or Firm* — Lee, Hong, Degerman, Kang & Waimey

(57) ABSTRACT

The present disclosure relates to a mobile terminal capable of image capture and a control method thereof. A mobile terminal according to an embodiment of the present disclosure may include a display unit, a camera arranged with a plurality of lenses along a plurality of lines, and a controller configured to capture images entered through the plurality of lenses, and display a first image on the display unit among a plurality of captured images, wherein the controller changes at least one region of the first image to at least part of an image different from the first image among the plurality of images based on the user's selection.

14 Claims, 16 Drawing Sheets

(51) Int. Cl.
| | |
|---|---|
| *H04B 1/3827* | (2015.01) |
| *G06T 3/00* | (2006.01) |
| *G06T 11/00* | (2006.01) |
| *G06F 3/01* | (2006.01) |
| *G06F 3/0488* | (2013.01) |
| *H04N 5/232* | (2006.01) |
| *G11B 27/031* | (2006.01) |
| *G11B 27/34* | (2006.01) |
| *G06F 3/0484* | (2013.01) |
| *H04N 5/225* | (2006.01) |
| *H04M 1/02* | (2006.01) |

(52) U.S. Cl.
 CPC ...... *G06F 3/04842* (2013.01); *G06F 3/04883* (2013.01); *G06T 3/00* (2013.01); *G06T 11/00* (2013.01); *G11B 27/031* (2013.01); *G11B 27/34* (2013.01); *H04B 1/3833* (2013.01); *H04N 5/2257* (2013.01); *H04N 5/23216* (2013.01); *H04N 5/23219* (2013.01); *H04N 5/23293* (2013.01); *H04M 1/0264* (2013.01); *H04M 2250/52* (2013.01)

(56) References Cited

U.S. PATENT DOCUMENTS

| | | | |
|---|---|---|---|
| 2012/0075412 A1* | 3/2012 | Miyamoto | G03B 35/00 348/36 |
| 2013/0033581 A1 | 2/2013 | Woo et al. | |

FOREIGN PATENT DOCUMENTS

| | | |
|---|---|---|
| KR | 2008-0042462 | 5/2008 |
| KR | 2011-0045549 | 5/2011 |

\* cited by examiner

[Fig. 1]
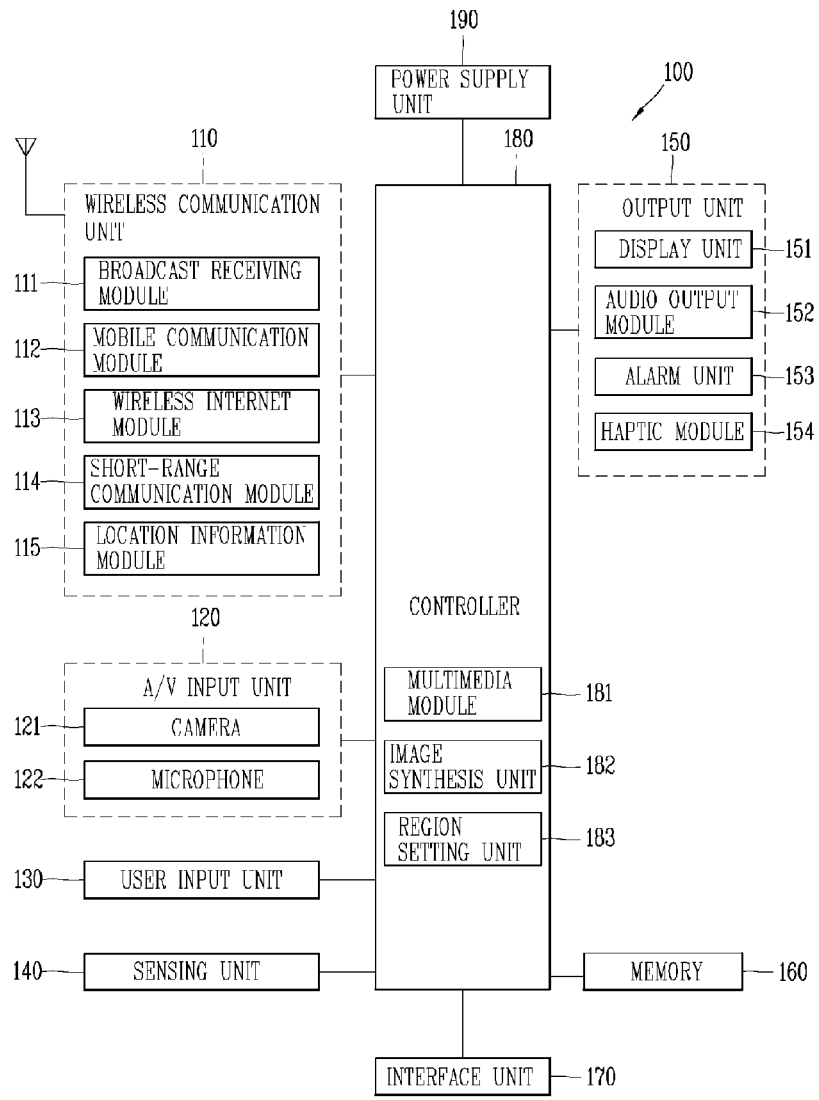
[Fig. 2a]
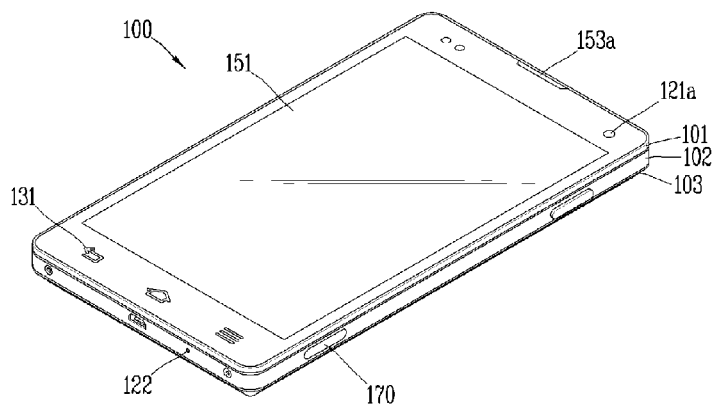

[Fig. 2b]
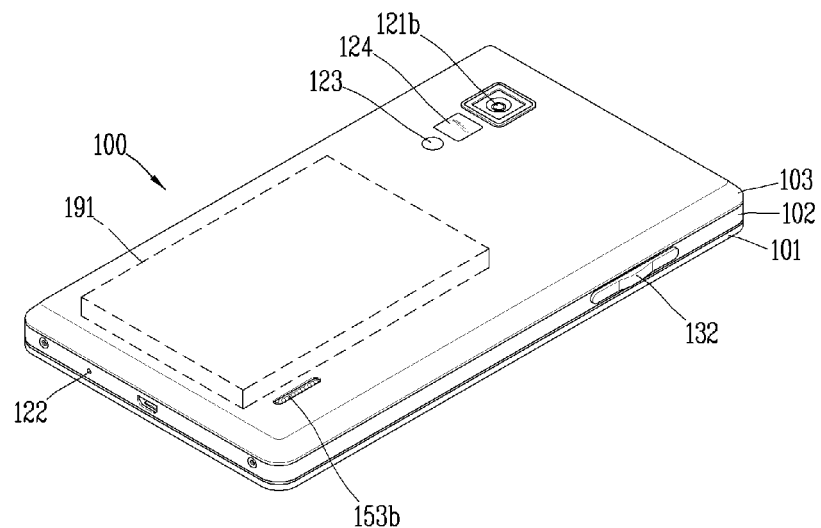
[Fig. 2c]
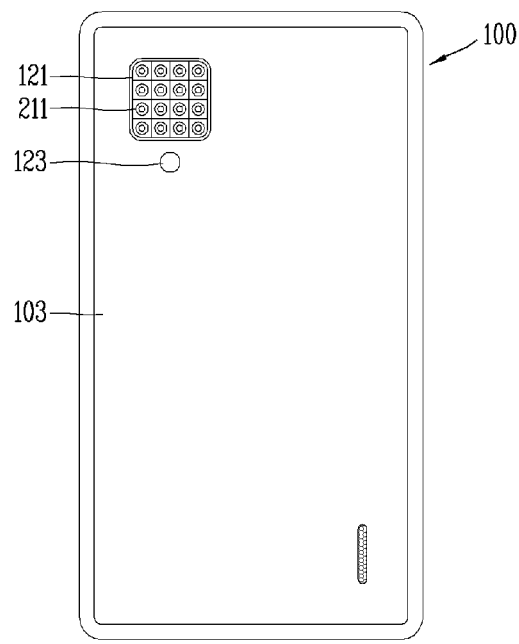

[Fig. 2d]
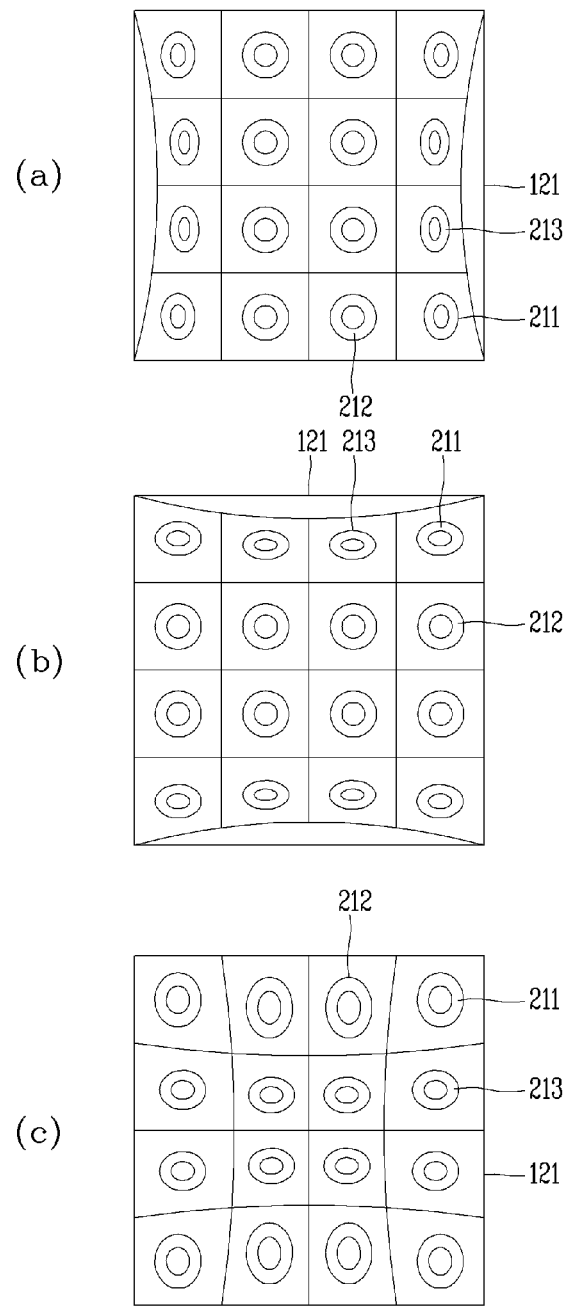

[Fig. 2e]
(a) 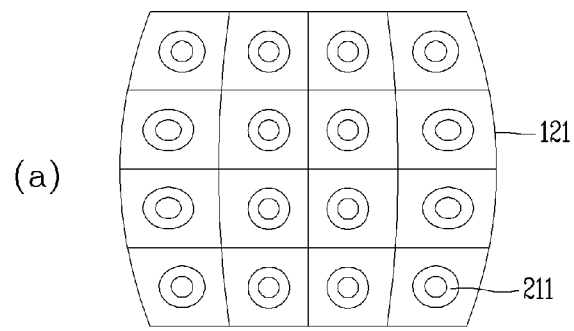
(b) 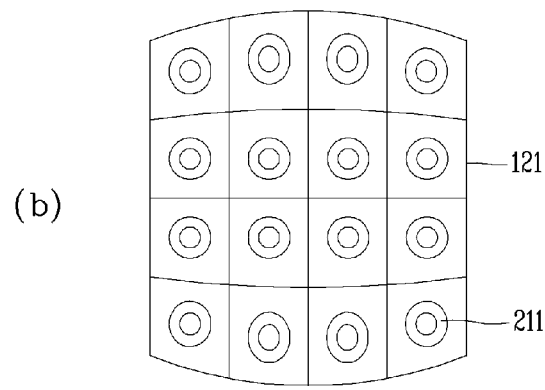
(c) 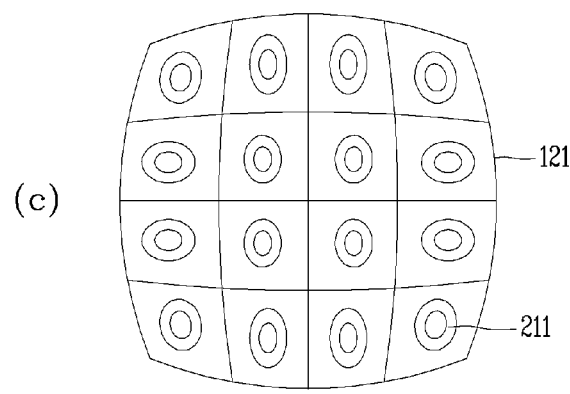

[Fig. 3]
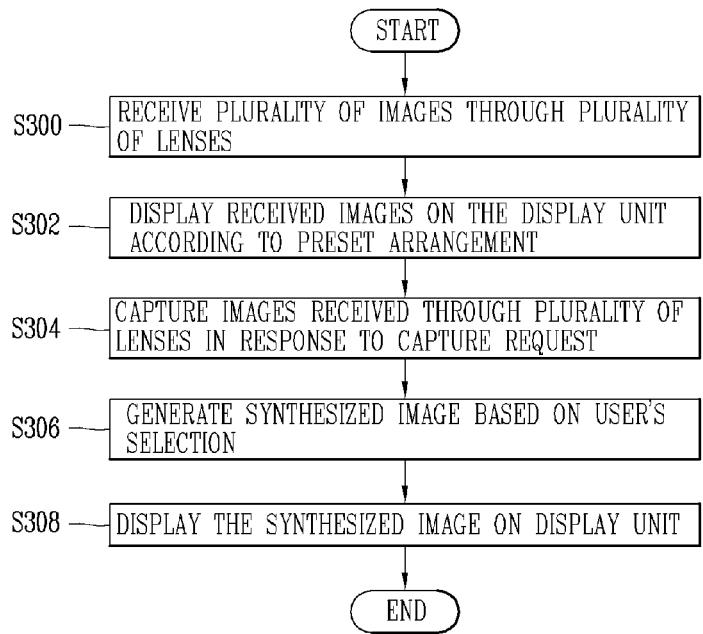

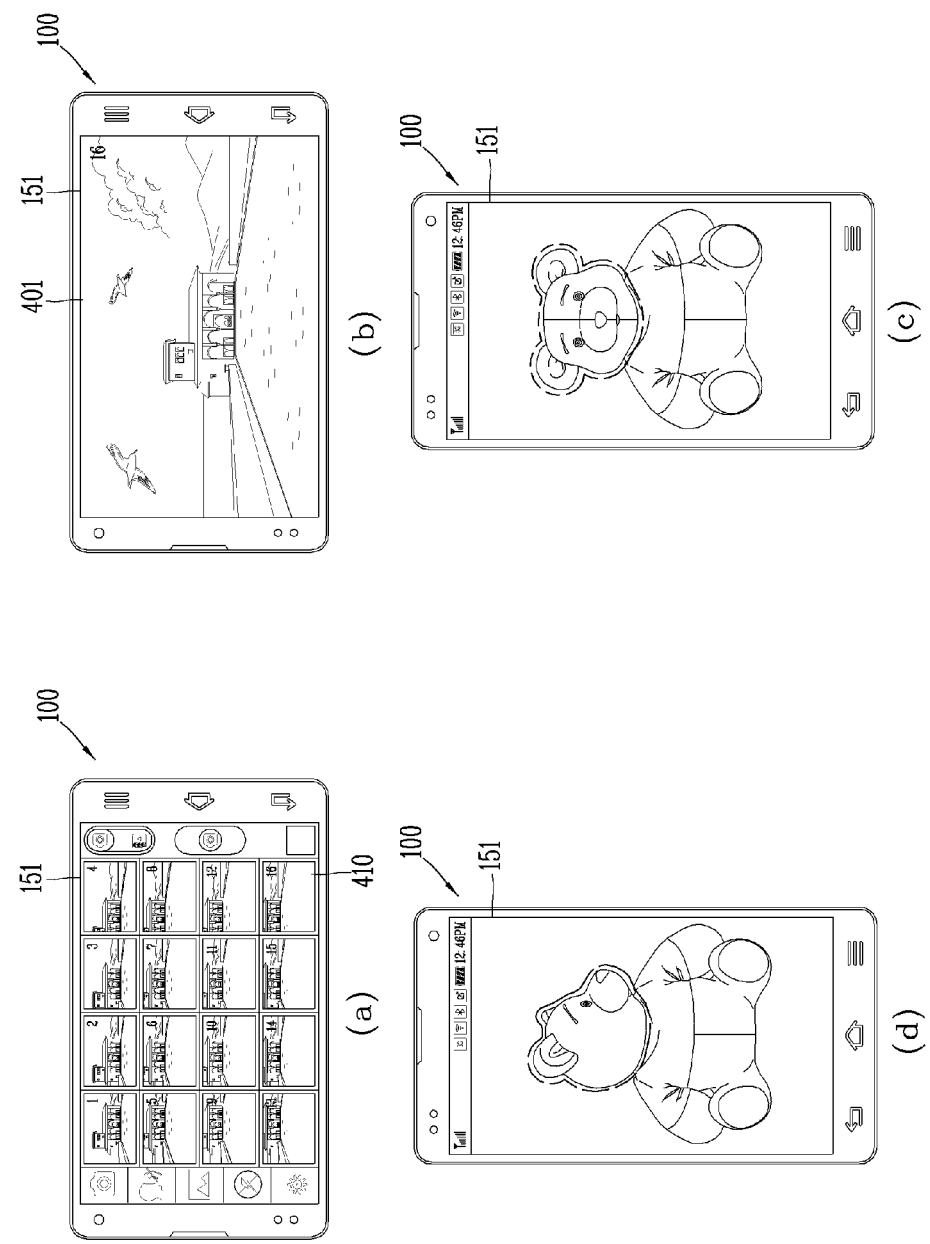
[Fig. 4]

[Fig. 5a]
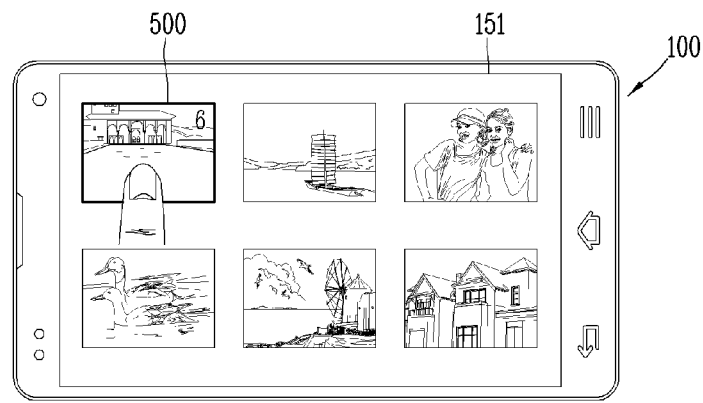
(a)
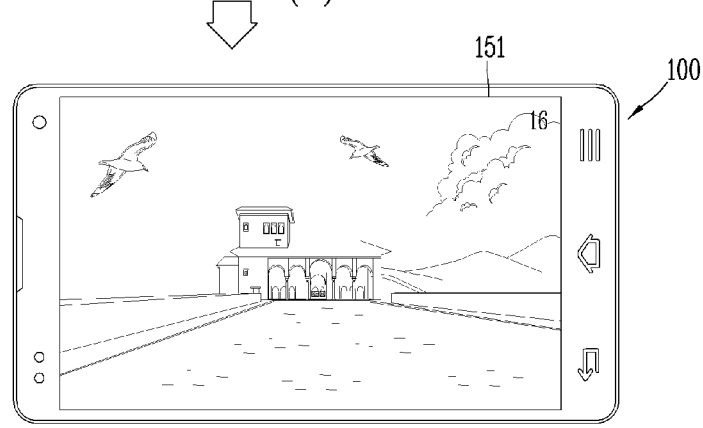
(b)
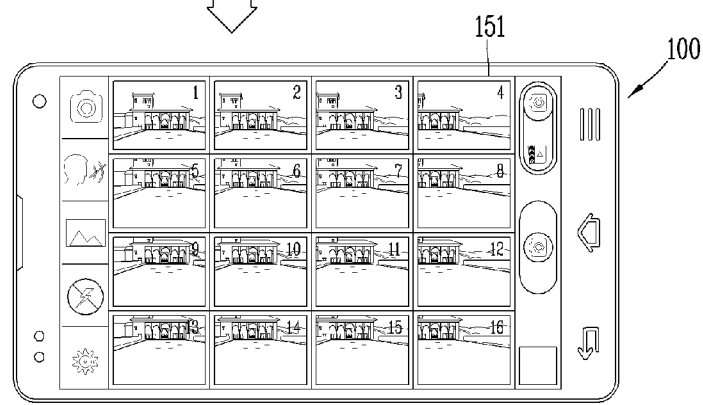
(c)

[Fig. 5b]
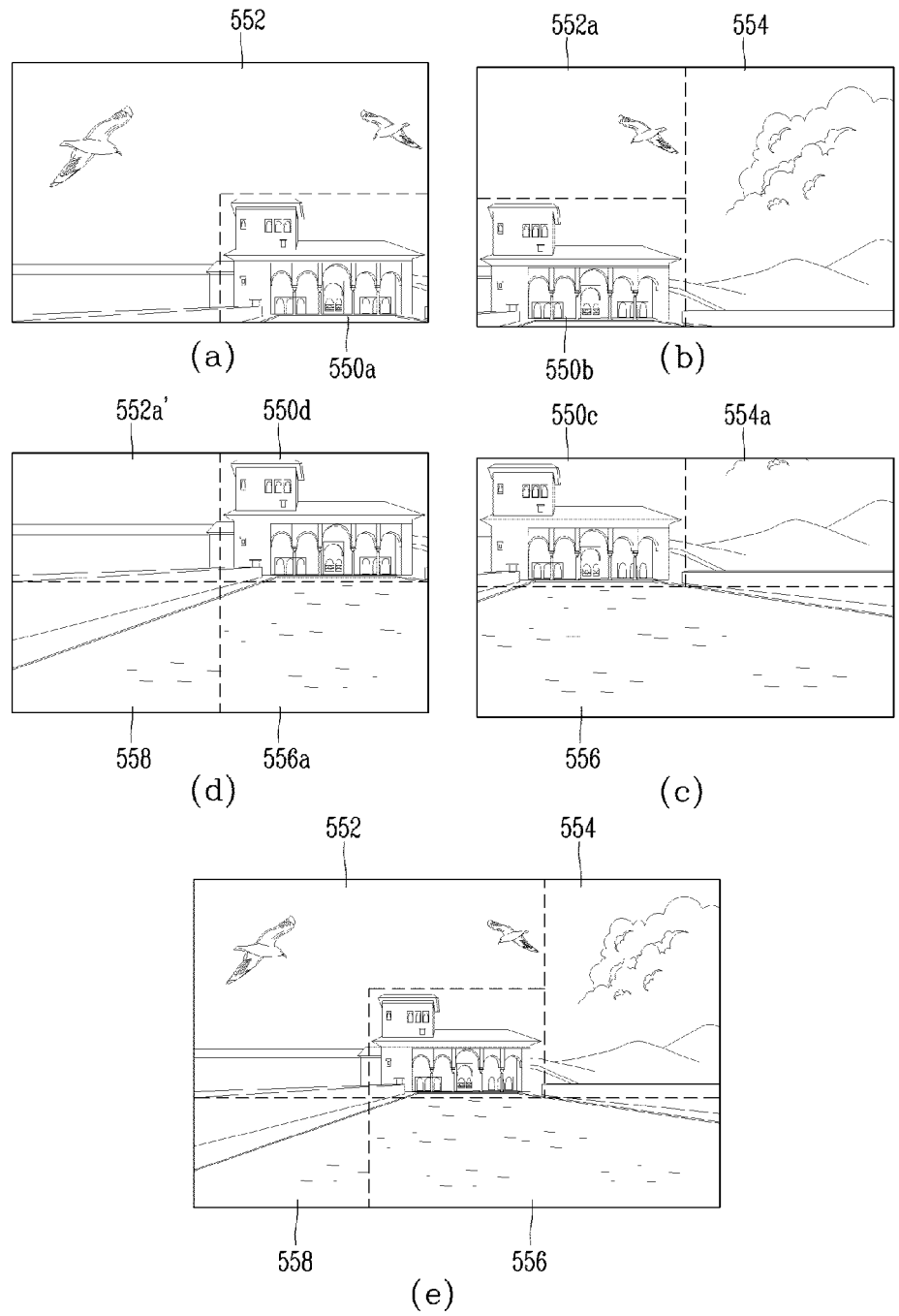

[Fig. 6a]
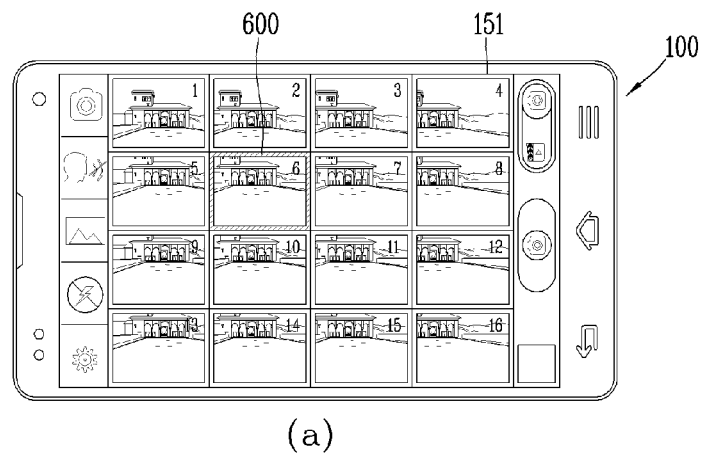
(a)
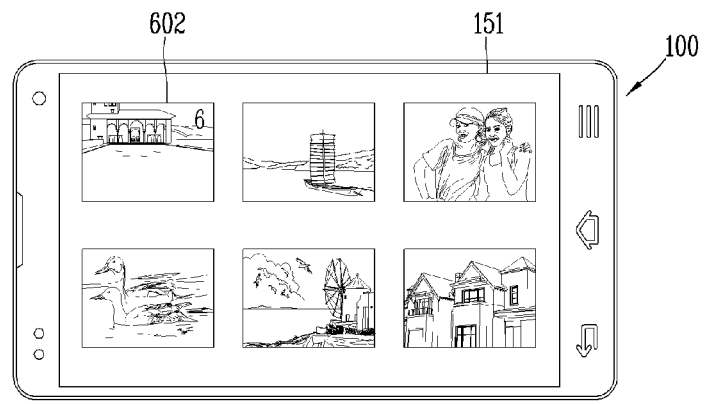
(b)

[Fig. 6b]
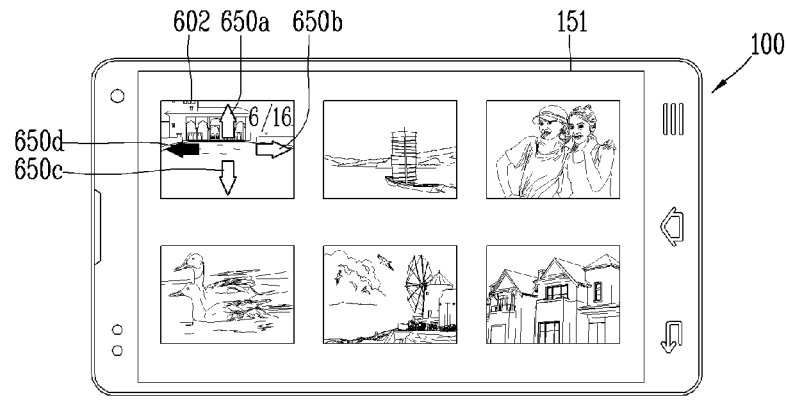
(a)
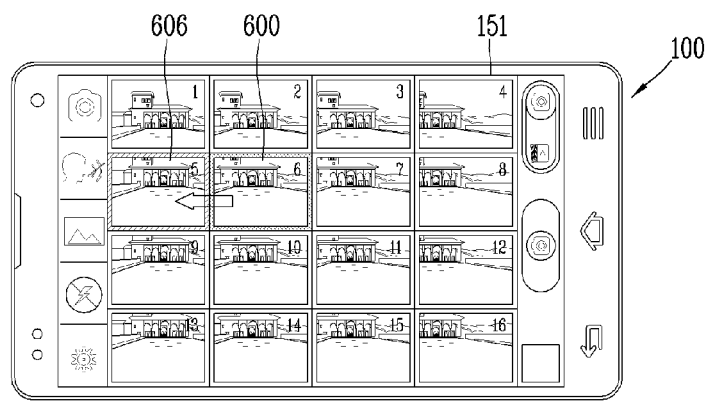
(b)
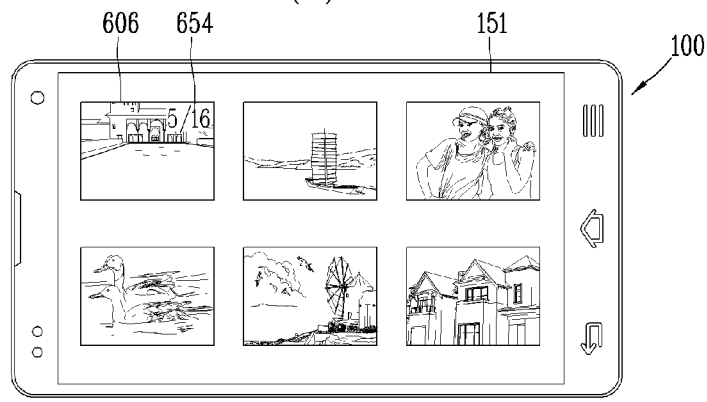
(c)

[Fig. 7]
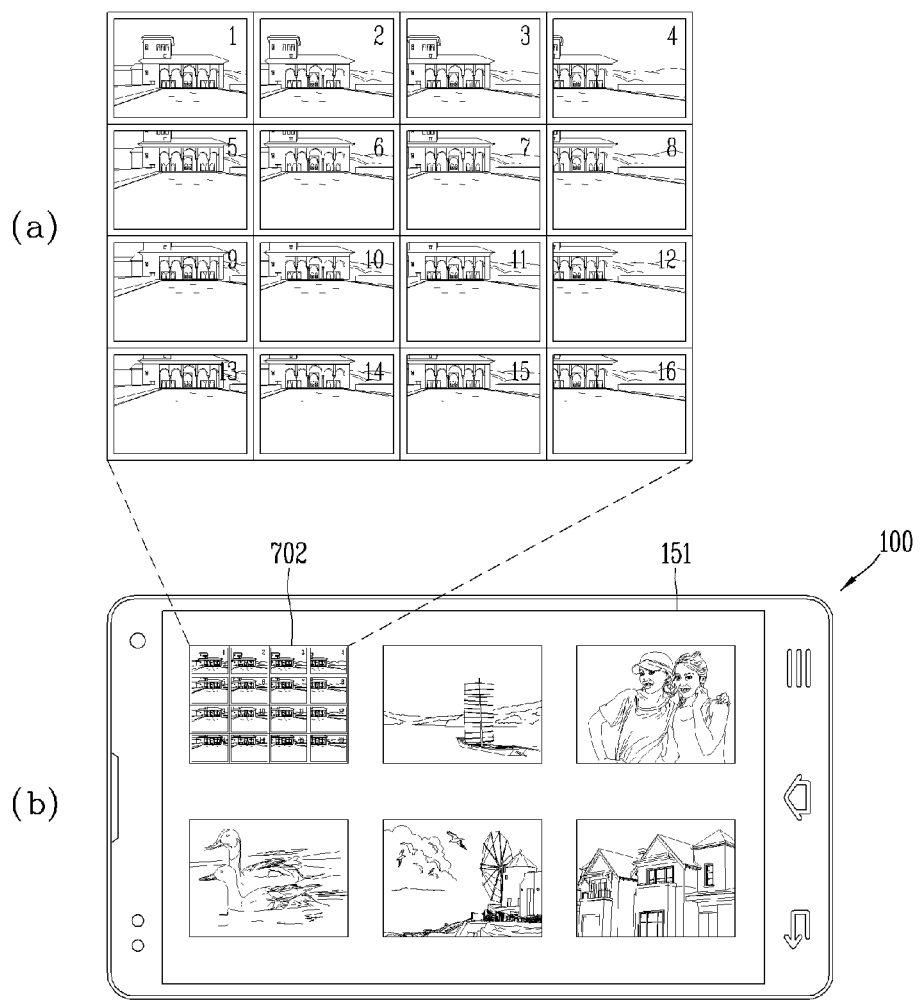

[Fig. 8]
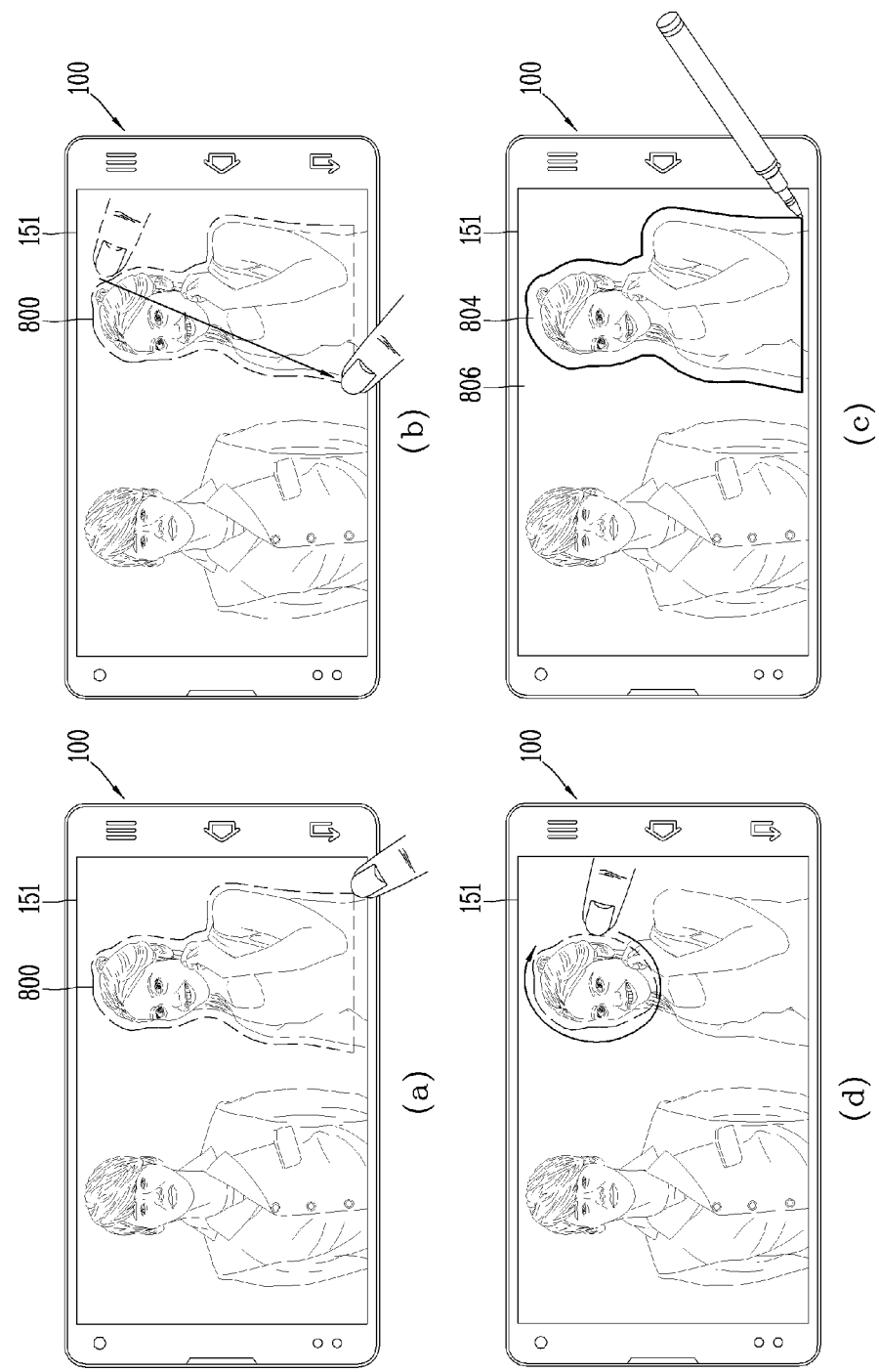

[Fig. 9a]
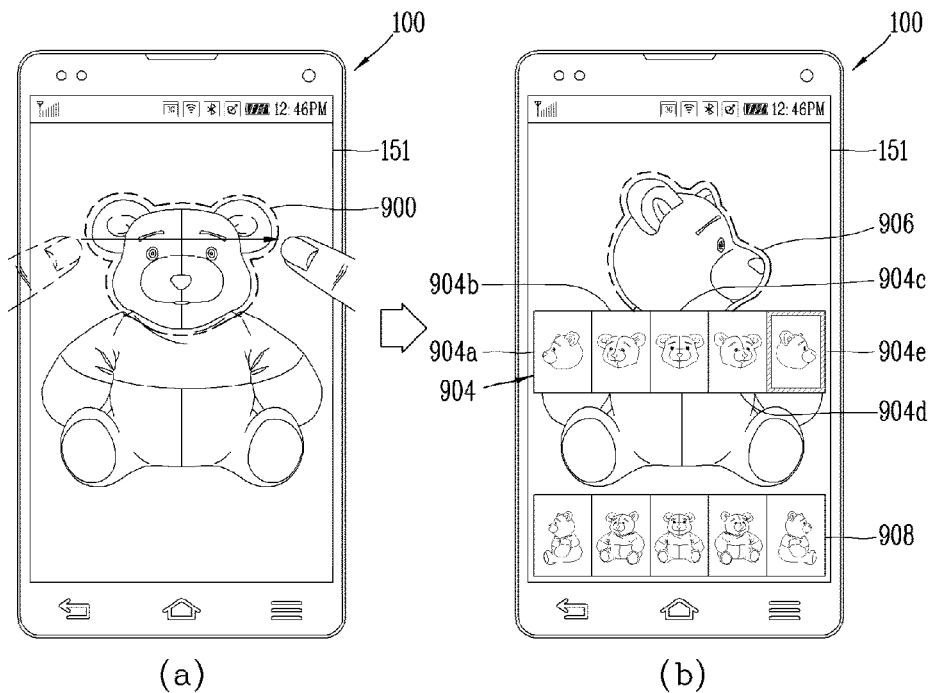
(a)　　　　　　　(b)
[Fig. 9b]
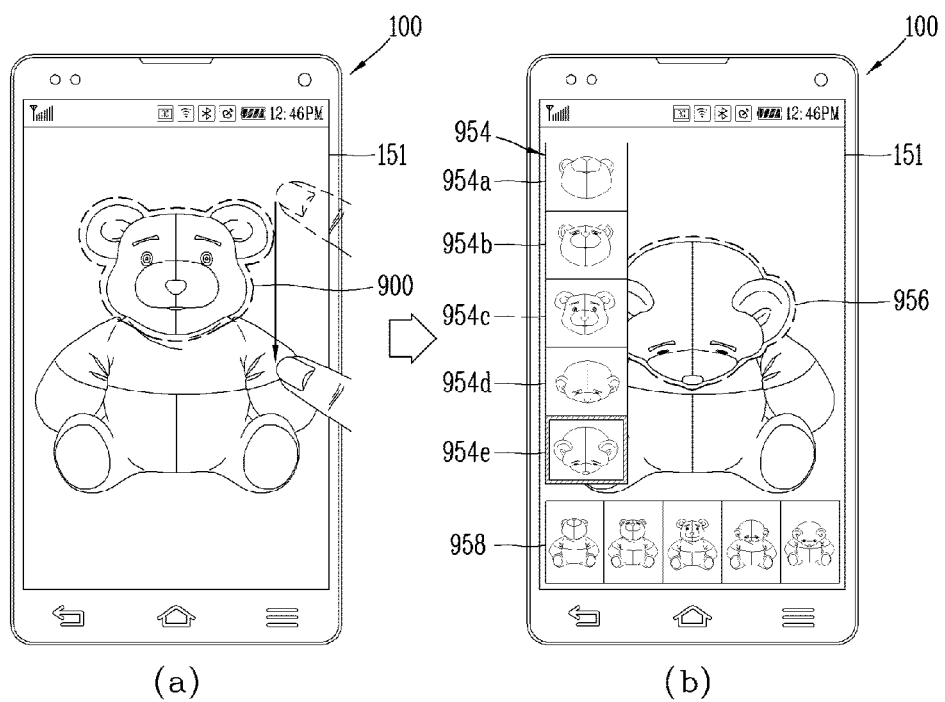
(a)　　　　　　　(b)

[Fig. 10]
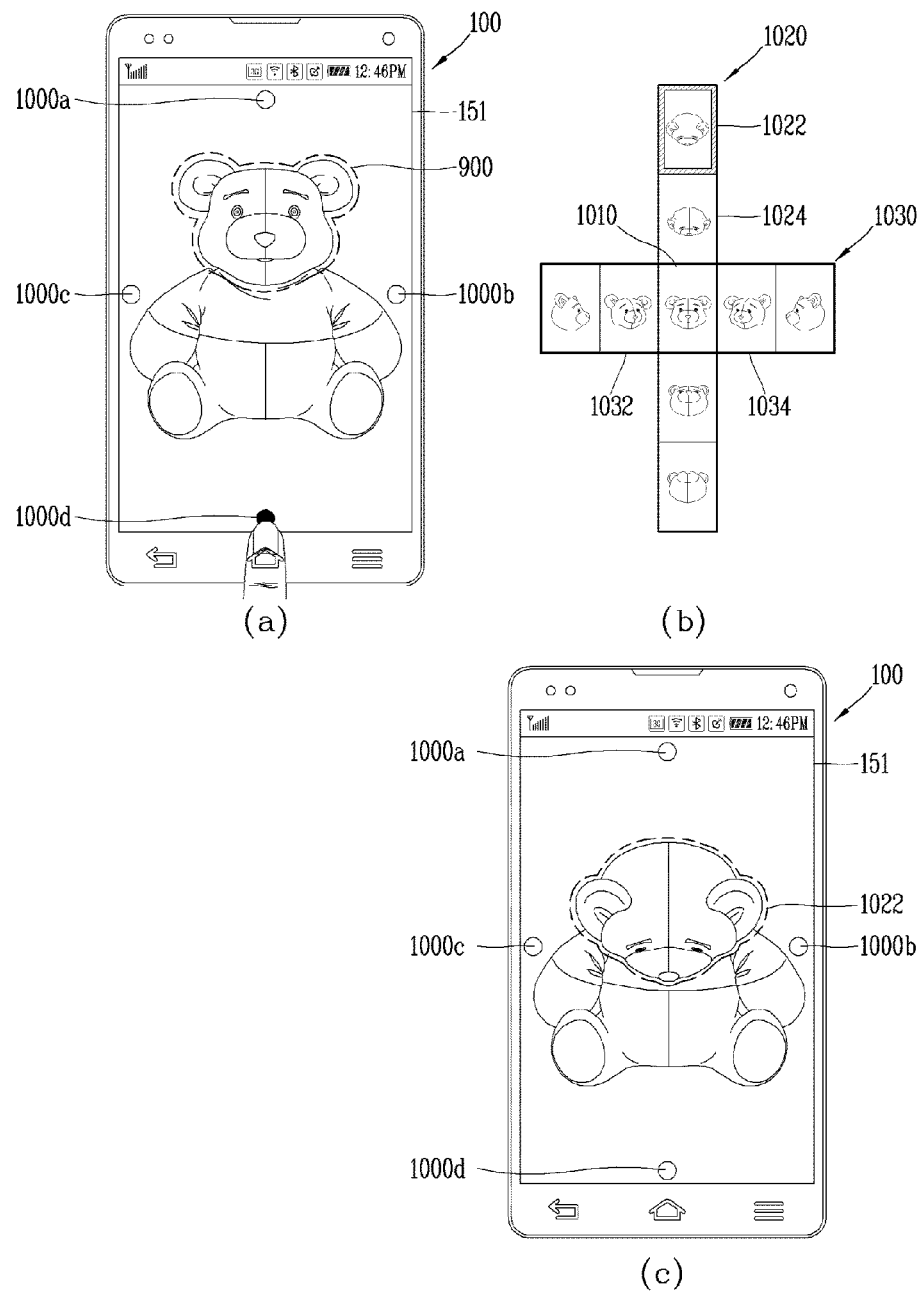

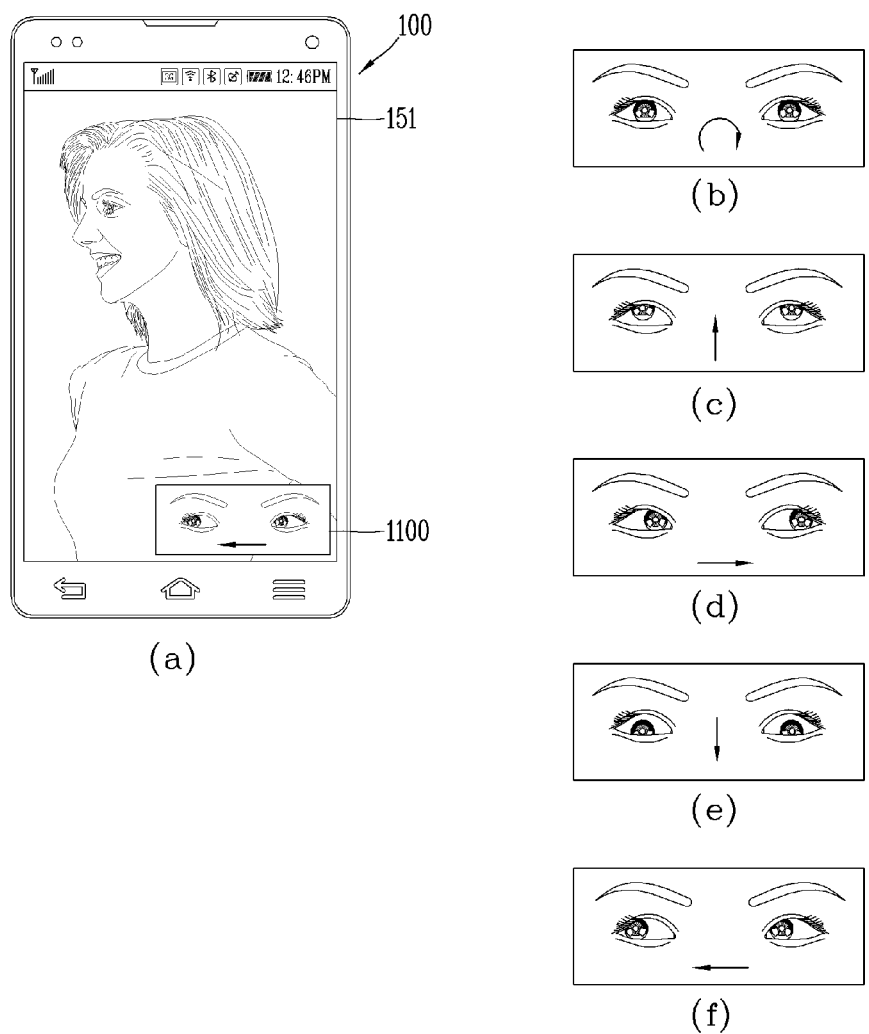
[Fig. 11]

[Fig. 12]
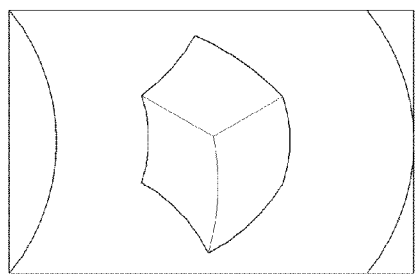
(a)
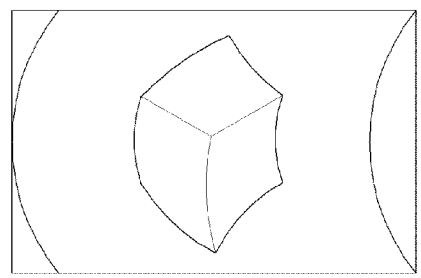
(b)
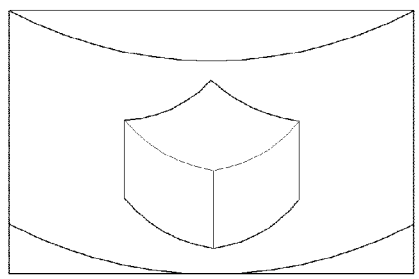
(c)
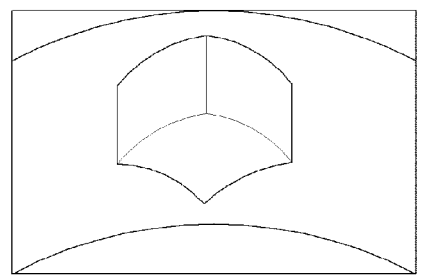
(d)

MOBILE TERMINAL AND CONTROL METHOD FOR THE MOBILE TERMINAL

CROSS-REFERENCE TO RELATED APPLICATIONS

This application is the National Stage filing under 35 U.S.C. 371 of International Application No. PCT/KR2014/000975, filed on Feb. 5, 2014, which claims the benefit of Korean Application No. 10-2013-0111286, filed on Sep. 16, 2013, the contents of which are all hereby incorporated by reference herein in their entirety.

TECHNICAL FIELD

The present disclosure relates to a mobile terminal capable of image capture and a control method thereof.

BACKGROUND ART

A mobile terminal may be configured to perform various functions. The examples of such various functions may include a data and voice communication function, a function of capturing still or moving images through a camera, a voice storage function, a function of playing music files through a speaker system, an image or video display function, and the like. Some mobile terminals may include an additional function capable of implementing games, and some other mobile terminals may be implemented as a multimedia player. Moreover, recent mobile terminals may receive broadcast or multicast signals, thereby allowing a user to view video or television programs.

Furthermore, efforts for supporting and enhancing the functions of the mobile terminal have been continued. The foregoing efforts may include the improvement of software and hardware as well as the change or improvement of structural elements constituting a mobile terminal.

In addition, owing to the foregoing improvement, a mobile terminal may be provided with a camera including a plurality of lenses to capture a subject at a plurality of focal points through the camera.

DISCLOSURE OF INVENTION

Technical Problem

An objective of the present disclosure relates to a mobile terminal for synthesizing a user's desired image using a plurality of images entered through a camera having a plurality of lenses, and a control method thereof.

Solution to Problem

In order to accomplish the foregoing objective, a mobile terminal according to an embodiment of the present disclosure may include a display unit, a camera arranged with a plurality of lenses along a plurality of lines, and a controller configured to capture images entered through the plurality of lenses, and display a first image on the display unit among a plurality of captured images, wherein the controller changes at least one region of the first image to at least part of an image different from the first image among the plurality of images based on the user's selection.

According to an embodiment, the controller may extract images subject to synthesis corresponding to an image displayed in one region of the first image from the plurality of images, respectively, when one region of the first image is selected.

According to an embodiment, the controller may synthesize any one of the images subject to synthesis based on the user's selection with an image of the remaining portion of the first image excluding the one region.

According to an embodiment, the any one the images subject to synthesis based on the user's selection may be determined based on the touch direction of a touch input applied to one region of the first image.

When a touch in a first direction is applied to the one region, a first image subject to synthesis corresponding to an image located in the first direction among the plurality of images on the basis of the first image may be synthesized with the first image, and when a touch in a second direction which is different from the first direction is applied to the one region, a second image subject to synthesis corresponding to an image located in the second direction among the plurality of images on the basis of the first image may be synthesized with the first image According to an embodiment, the display unit may be partitioned into a first region in which the first image is displayed and a second region in which at least some thumbnail images of the plurality of images are displayed, and the second region may include a thumbnail image of the image subject to synthesis to be synthesized with the first image.

According to an embodiment, wherein the controller may display the thumbnail image of the image subject to synthesis in a highlighted manner to be distinguished from the other thumbnail images contained in the second region.

According to an embodiment, images subject to synthesis corresponding to an image displayed in one region of the first image, extracted from the plurality of images, respectively, may be displayed in one region of the display unit, and the controller may synthesize an image subject to synthesis selected by the user among the displayed images subject to synthesis with the first image.

According to an embodiment, at least one of the plurality of lenses may be arranged to have a different capture angle from the other one thereof.

According to an embodiment, the mobile terminal may further include a sensing unit configured to sense the direction of the user's gaze, wherein when a first region of the first image is selected, the controller changes the first region to part of an image captured through a lens corresponding to the user's gaze direction among the plurality of images.

According to an embodiment, when the gaze direction is changed, the controller may change the first region to part of an image captured through a lens corresponding to the changed gaze direction among the plurality of images.

According to an embodiment, the mobile terminal may further include a sensing unit configured to sense the inclination of the mobile terminal, wherein when a first region of the first image is selected, the controller changes the first region to part of an image captured through a lens having a capture angle corresponding to an inclined angle of the mobile terminal.

According to an embodiment, when an inclined angle of the mobile terminal is changed, the controller may change the first region to part of an image captured through a lens corresponding to the changed angle among the plurality of images.

A mobile terminal according to an embodiment of the present disclosure a display unit, a camera arranged with a plurality of lenses along a plurality of lines, and a controller configured to capture images entered through the plurality of lenses, and generate one extended image with the plurality of captured images, wherein the controller generates the extended image using different portions of image regions of the plurality of images, respectively, around a common portion of image region of the plurality of images.

According to an embodiment, the controller may display the number of the plurality of images around the extended image.

According to an embodiment, when the synthesized image is selected, the controller may partition the display unit into a plurality of regions to correspond to the number of the plurality of lenses, and display any one of the plurality of images for each of the plurality of regions.

According to an embodiment, when an image displayed in any one of the plurality of partitions is selected, the controller may enlarge the selected image to display it on the display unit, and display a graphic object containing the unique information of a lens that has captured the selected image around the selected image.

According to an embodiment, when the user's touch input to the selected image is sensed, the controller may change the selected image to an image determined based on the user's touch input among the plurality of images.

A control method of a mobile terminal having a camera arranged with a plurality of lenses according to an embodiment of the present disclosure may include capturing a plurality of images entered from the plurality of lenses, determining any one of the plurality of images as a first image, and generating a synthesized image using at least one of the plurality of images on the basis of the first image, and displaying at least one of the captured images or the synthesized image on the display unit of the mobile terminal.

According to an embodiment, said generating the synthesized image may be synthesizing a plurality of the other images excluding the first image with image regions having portions different from the first image to generate the synthesized image around the image region of a common portion of a plurality of images different from the first image to generate the synthesized image.

According to an embodiment, said generating the synthesized image may be generating a synthesized image in which part of the first image is replaced with part of any one of a plurality of the other images excluding the first image.

Advantageous Effects of Invention

According to a mobile terminal and a control method thereof in accordance with an embodiment of the present disclosure, part of any one of a plurality of images entered through a plurality of lenses may be replaced with part of another one thereof, thereby allowing the user to synthesize his or her desired image from the plurality of images.

Furthermore, according to a mobile terminal and a control method thereof in accordance with an embodiment of the present disclosure, a plurality of images entered through a plurality of lenses may be synthesized into one extended image around a common portion thereof, thereby allowing the user to use the plurality of lenses as one big lens.

BRIEF DESCRIPTION OF DRAWINGS

FIG. 1 is a block diagram illustrating a mobile terminal according to an embodiment of the present disclosure;

FIG. 2A is a front perspective view illustrating an example of a mobile terminal according to an embodiment of the present disclosure;

FIG. 2B is a rear perspective view illustrating an example of a mobile terminal according to an embodiment of the present disclosure;

FIG. 2C is a rear perspective view illustrating an example of a mobile terminal according to another embodiment of the present disclosure;

FIG. 2D is an example of a camera provided with a plurality of lenses in a mobile terminal according to another embodiment of the present disclosure;

FIG. 2E is another example of a camera provided with a plurality of lenses in a mobile terminal according to another embodiment of the present disclosure;

FIG. 3 is a flow chart for explaining a method of generating and displaying an image synthesized or changed using a plurality of images captured through a plurality of lenses in a mobile terminal according to an embodiment of the present disclosure;

FIG. 4 is a conceptual view for explaining a method of generating and displaying an image illustrated in FIG. 3;

FIG. 5A is a conceptual view for explaining a method of displaying an image according to the user's selection in a mobile terminal according to an embodiment of the present disclosure;

FIG. 5B is a conceptual view for explaining a method of synthesizing a plurality of images into one image in a mobile terminal according to an embodiment of the present disclosure;

FIGS. 6A and 6B are conceptual views for explaining a method of displaying a representative image among a plurality of images in a mobile terminal according to an embodiment of the present disclosure;

FIG. 7 is a conceptual view for explaining another method of displaying a representative image among a plurality of images in a mobile terminal according to an embodiment of the present disclosure;

FIG. 8 is a conceptual view for explaining a method of allowing the user to select part of an image in a mobile terminal according to an embodiment of the present disclosure;

FIGS. 9A and 9B are conceptual views for explaining a method of generating a new image in which part of an image has been changed in a mobile terminal according to an embodiment of the present disclosure;

FIG. 10 is a conceptual view for explaining a method of determining an image to be synthesized based on the user's touch input in a mobile terminal according to an embodiment of the present disclosure;

FIG. 11 is a conceptual view for explaining a method of displaying the user's gaze or the inclination level of the mobile terminal in a mobile terminal according to an embodiment of the present disclosure; and FIG. 12 is a conceptual view for explaining a method of distorting an image along the user's gaze direction in a mobile terminal according to an embodiment of the present disclosure.

MODE FOR THE INVENTION

Hereinafter, preferred embodiments of the present invention will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present invention, moreover, the detailed description will be omitted when a specific description for publicly known technologies to which the invention pertains is judged to obscure the gist of the present invention.

A mobile terminal disclosed herein may include a portable phone, a smart phone, a laptop computer, a digital broadcast mobile device, a personal digital assistant (PDA), a mobile multimedia player (PMP), a navigation, a slate PC, a tablet PC, an ultrabook, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 according to an embodiment disclosed in the present disclosure.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the foregoing constituent elements will be described in sequence.

The wireless communication unit 110 may include one or more modules allowing radio communication between the mobile terminal 100 and a wireless communication system, or allowing radio communication between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems.

Broadcast signals and/or broadcast associated information received via the broadcast receiving module 111 may be stored in a memory 160.

The mobile communication module 112 transmits and receives wireless signals to and from at least one a base station, an external terminal and a server on a mobile communication network. Here, the wireless signals may include audio call signals, video call signals, or various formats of data according to the transmission and reception of text/multimedia messages.

The mobile communication module 112 may be configured to implement an video communication mode and a voice communication mode. The video communication mode refers to a configuration in which communication is made while viewing the image of the counterpart, and the voice communication mode refers to a configuration in which communication is made without viewing the image of the counterpart. The mobile communication module 112 may be configured to transmit or receive at least one of audio or video data to implement the video communication mode and voice communication mode.

The wireless Internet module 113 refers to a module for supporting wireless Internet access, and may be built-in or externally installed on the mobile terminal 100. Here, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth™, Radio Frequency IDentification (RFID), Infrared Data Association (IrDA), Ultra WideBand (UWB), ZigBee, and the like.

The location information module 115 is a module for checking or acquiring the location of the mobile terminal, and there is a Global Positioning Module (GPS) module or the like as a representative example.

Referring to FIG. 1, the A/V (audio/video) input unit 120 receives an audio or video signal, and the A/V (audio/video) input unit 120 may include a camera 121, a microphone 122, and the like. The camera 121 processes image frames, such as still or moving images, obtained by an image sensor, namely, lens, in a video phone call or image capturing mode. The processed image frame may be displayed on a display unit 151. Furthermore, the camera 121 may receive images received from the plurality of lenses, respectively, and process image frames with the received plurality of images. Furthermore, the processed image frames with the plurality of images may be displayed on the display unit 151.

The image frames processed by the camera 121 may be stored in the memory 160 or transmitted to the outside through the wireless communication unit 110. Two or more cameras 121 may be provided according to the use environment.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed configuration of the mobile terminal 100, a location of the mobile terminal 100, a presence or absence of user contact with the mobile terminal 100, an orientation of the mobile terminal 100, an acceleration/deceleration of the mobile terminal 100, and the like, so as to generate a sensing signal for controlling the operation of the mobile terminal 100. For example, when the mobile terminal 100 is a slide phone type, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling between the interface unit 170 and an external device.

The sensing unit 140 may include at least one sensor. For example, the sensing unit 140 may include an acceleration sensor, an inertial sensor, and a gyro sensor. Through this, the sensing unit 140 may sense the current status of the mobile terminal 100, such as an extent or direction of the movement of the mobile terminal 100, or a configuration in which the mobile terminal 100 is inclined in a direction perpendicular to the ground surface (hereinafter, referred to as a "longitudinal direction") or in a direction parallel to the ground surface (hereinafter, referred to as a "transverse direction"), or the like.

In addition, the sensing unit 140 may include a pupil recognition sensor capable of sensing the user's gaze. In this case, the sensing unit 140 may recognize the user's pupil to sense the user's gaze direction.

The output unit 150 is configured to generate an output associated with visual sense, auditory sense or tactile sense, and may include a display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a mobile terminal body through a region occupied by the display unit 151 of the mobile terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

When the display unit 151 and a touch sensitive sensor (hereinafter, referred to as a "touch sensor") have an inter-layer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor.

When there is a touch input to the touch sensor, the corresponding signals are transmitted to a touch controller. The touch controller processes the signal(s), and then transmits the corresponding data to the controller 180. Accordingly, the controller 180 may sense which region of the display unit 151 has been touched.

Referring to FIG. 1, a proximity sensor may be arranged at an inner region of the mobile device 100 surrounded by the touch screen, or adjacent to the touch screen. The proximity sensor refers to a sensor to sense the presence or absence of an object approaching to a surface to be sensed, or an object disposed adjacent to a surface to be sensed, by using an electromagnetic field or infrared rays without a mechanical contact. The proximity sensor has a longer lifespan and a more enhanced utility than a contact sensor.

The examples of the proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by a change of electromagnetic field due to the proximity of the pointer. In this case, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to the functions performed in the mobile terminal 100 (e.g., sound alarming a call received or a message received, and so on). The audio output module 152 may include a receiver, a speaker, a buzzer, and so on.

The alarm unit 153 outputs signals notifying occurrence of events from the mobile terminal 100. The events occurring from the mobile terminal may include call received, message received, key signal input, touch input, and so on. The alarm unit 153 may output not only video or audio signals, but also other types of signals such as signals notifying occurrence of events in a vibration manner. Since the video or audio signals can be output through the display unit 151 or the audio output module 152, they 151, 152 may be categorized into part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

When the camera 121 is provided with a plurality of lenses, the memory 160 may store images captured with the plurality of lenses. Here, the memory 160 may store the captured images in the transverse or longitudinal direction according to a preset arrangement order.

For example, the captured images may be determined in the transverse or longitudinal direction based on the order in which the plurality of lenses are arranged.

Here, images stored in the memory 160 may not be one complete image but the remaining portions of the images excluding a common portion of a previously stored image. In this case, the data size of images stored in the memory 160 can be greatly reduced. The store information of images captured through the plurality of lenses, namely, a direction, a sequence or a scheme in which the captured images are stored may be stored in the form of metadata.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via the interface unit 170.

The interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

Furthermore, when the camera 121 includes a plurality of lenses, the controller 180 may generate a synthesized image using a plurality of images captured through the plurality of lenses. For example, the controller 180 may synthesize the plurality of images on the basis of a common portion, thereby generating one extended image in which different portions of the plurality of images, respectively, are synthesized around the common portion. In other words, the controller 180 synthesizes a plurality of images captured through the plurality of lenses, respectively, to generate an image as if it is captured through one huge lens. To this end, the controller 180 may include an image synthesis unit 182. The image synthesis unit 182 may be implemented within the controller 180 or implemented separately from the controller 180.

Furthermore, the image synthesis unit 182 may generate a newly changed synthesized image using a plurality of images. For example, the image synthesis unit 182 may allow the user to select at least part of one of the plurality of images. Here, the "at least part" selected by the user may refer to the whole of a particular subject image contained in any one of the plurality of images or refer to only part of the particular subject image.

In this manner, in order to allow the user to select at least a partial region from a particular image, the controller 180 may include a region setting unit 183. Here, the region setting unit 183 may be implemented within the controller 180 or implemented separately from the controller 180.

For example, the region setting unit 183 may set part of an image currently displayed on the display unit 151 to a "region subject to change". In other words, when the user touches part of an image (for example, part of a particular subject image) currently displayed on the display unit 151, the region setting unit 183 may set the whole or part of the subject image to the region subject to change.

Furthermore, the region setting unit 183 may set not only an image currently displayed on the display unit 151 but also a region corresponding to the region subject to change for each of the plurality of images. In other words, when a particular subject image is selected by the user, the region setting unit 183 may set a region displayed with an image corresponding to the particular subject to the plurality of images, respectively.

Then, the controller 180 may extract images displayed in the set region from the plurality of images, respectively. Furthermore, the controller 180 may replace an image in the region subject to change, namely, a region displayed with the particular subject, with any one of the extracted images based on the user's selection, thereby generating a newly changed image.

Furthermore, the controller 180 may perform a pattern recognition processing capable of recognizing a handwriting input or a drawing input carried out on the touch screen as text and images, respectively.

Furthermore, when the status of the mobile terminal satisfies a preset condition, the controller 180 may implement a lock state in which the user's control command input to applications is restricted. Furthermore, the controller 180 may control a lock screen displayed in the lock state based on a touch input sensed through the display unit 151 (hereinafter, referred to as a "touch screen") in the lock state.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, and electrical units designed to perform the functions described herein. In some cases, such embodiments may be implemented in the controller 180 itself.

For software implementation, the embodiments such as procedures or functions described in the present disclosure may be implemented with separate software modules. Each of the software modules may perform at least one function or operation described in the present disclosure.

Software codes can be implemented by a software application written in any suitable programming language. The software codes may be stored in the memory 160 and executed by the controller 180.

Hereinafter, a mobile terminal according to an embodiment of the present disclosure as illustrated above in FIG. 1 or a mobile terminal disposed with the constituent elements of the mobile terminal or the structure of a mobile terminal will be described.

FIG. 2A is a front perspective view illustrating a mobile terminal according to the present disclosure or an example of the mobile terminal, and FIG. 2B is a rear perspective view illustrating a mobile terminal illustrated in FIG. 2A.

The mobile terminal 100 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

According to the drawing, the terminal body 100 (hereinafter, referred to as a "body") may include a front surface, a lateral surface, and a rear surface. Furthermore, the body may include both ends thereof formed along the length direction.

The body 100 includes a case (casing, housing, cover, etc.) forming an appearance of the terminal. In this embodiment, the case may be divided into a front surface (hereinafter, referred to as a "front case") 101 and a rear surface (hereinafter, referred to as a "rear case") 102. Various electronic components may be incorporated into a space formed between the front case 101 and rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

A display unit 151, an audio output module 152, a camera 121, a user input unit 130/131, 132, a microphone 122, an interface 170, and the like may be arranged on the terminal body 100, mainly on the front case 101.

The display unit 151 occupies a most portion of the front case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the front case 101 and the rear case 102. On the contrary, the microphone 122 may be disposed at the other end of the body 100.

The user input unit 130 is manipulated to receive a command for controlling the operation of the portable terminal 100, and may include a plurality of manipulation units 131, 132. The manipulation units 131, 132 may be commonly designated as a manipulating portion, and any method may be employed if it is a tactile manner allowing the user to perform manipulation with a tactile feeling.

The content inputted by the manipulation units 131, 132 may be set in various ways. For example, the first manipulation unit 131 may receive a command, such as start, end, scroll, or the like, and the second manipulation unit 132 may receive a command, such as controlling a volume level being outputted from the audio output unit 152, or switching it into a touch recognition mode of the display unit 151.

Referring to FIG. 2B, an audio output unit 152' may be additionally disposed on a rear surface, namely, a rear case 102, of the terminal body. The audio output unit 152' together with the audio output unit 152 (refer to FIG. 2A) can implement a stereo function, and it may be also used to implement a speaker phone mode during a phone call.

A power supply unit 190 for supplying power to the mobile terminal 100 may be mounted on a rear surface of the terminal body. The power supply unit 190 may be configured so as to be incorporated in the terminal body, or directly detachable from the outside of the terminal body.

Furthermore, a touch pad 135 for detecting a touch may be additionally mounted on the rear case 102. The touch pad 135 may be configured in an optical transmission type similarly to the display unit 151. In this case, if the display unit 151 is configured to output visual information from both sides of the display unit 151, then the visual information may be also recognized through the touch pad 135. The information being outputted from the both sides thereof may be controlled by the touch pad 135. In addition, a display may be additionally mounted on the touch pad 135, and a touch screen may be also disposed on the rear case 102.

Furthermore, a camera 121' may be additionally mounted on the rear case 102 of the terminal body. The camera 121' has an image capturing direction, which is substantially opposite to the direction of the camera 121 (refer to FIG. 2A), and may have different pixels from those of the first video input unit 121.

For example, that the camera 121 may preferably have a relatively small number of pixels enough not to cause a difficulty when the user captures his or her own face and sends it to the other party during a video call or the like, and the camera 121' has a relatively large number of pixels since the user often captures a general object that is not sent immediately. The cameras 121' may be provided in the terminal body 100 in a rotatable and popupable manner.

A flash 123 and a mirror 124 may be additionally disposed adjacent to the camera 121'. The flash 123 illuminates light toward an object when capturing the object with the camera 121'. The mirror allows the user to look at his or her own face, or the like, in a reflected way when capturing himself or herself (in a self-portrait mode) by using the camera 121'.

An audio output unit 252' may be additionally disposed on a rear surface of the terminal body. The audio output unit 252' together with the audio output unit 252 (refer to FIG. 2A) can implement a stereo function, and it may be also used to implement a speaker phone mode during a phone call.

Furthermore, a power supply unit 190 for supplying power to the portable terminal 100 may be mounted on a rear surface of the terminal body. The power supply unit 190 may be configured so as to be incorporated in the terminal body, or directly detachable from the outside of the terminal body.

A touch pad 135 for detecting a touch may be additionally mounted on the rear case 102. The touch pad 135 may be configured in an optical transmission type similarly to the display unit 151. In this case, if the display unit 151 is configured to output visual information from both sides of the display unit 151, then the visual information may be also recognized through the touch pad 135. The information being outputted from the both sides thereof may be controlled by the touch pad 135. In addition, a display may be additionally mounted on the touch pad 135, and a touch screen may be also disposed on the rear case 102.

The touch pad 135 operates in a reciprocal relation to the display unit 151 of the front case 101. The touch pad 135 may be disposed in parallel on a rear side of the display unit 151. The touch pad 135 may have the same or a smaller size as or than that of the display unit 151.

In addition, a mobile terminal capable of containing at least one or more of the foregoing constituent elements according to an embodiment of the present disclosure may include a camera 121 in which a plurality of lenses are arranged along a plurality of lines as illustrated in FIG. 2C.

A camera arranged with a plurality of lenses in this manner may be referred to as an "array camera". As illustrated in the drawing, a plurality of lenses may be arranged in a matrix form in the array camera.

For the array camera, the plurality of lenses may be arranged on a plane, but may be also arranged on a curved surface. Furthermore, the plurality of lenses may be arranged on a curved surface concavely formed into the rear case 102 of the mobile terminal 100, or arranged on a curved surface convexly formed out of the rear case 102 thereof.

FIGS. 2D and 2E illustrate an implementation example of such an array camera.

First, referring to FIG. 2D, the plurality of lenses may be arranged along a curved surface on which a plurality of lines in either one of the horizontal and longitudinal directions are concavely formed as illustrated in FIGS. 2D(a) and 2D(b). Furthermore, the plurality of lenses may be also arranged along a curved surface, namely, spherical surface, on which a plurality of lines in the transverse or longitudinal direction are all concavely formed as illustrated in as illustrated in FIG. 2D(c).

When a plurality of lenses are arranged on a curved surface, a subject may be captured at a different capture angle by each lens. For example, in case of FIG. 2D(a), the longitudinal directional capture angles of lens-a 211 and lens-b 212 are the same, but the longitudinal directional capture angles of lens-c 213, lens-a 211 and lens-b 212 may be different from one another. Furthermore, in case of FIG. 2D(c), the transverse directional capture angles of lens-a 211 and lens-c 213 are the same, but the transverse directional capture angles of lens-b 212, lens-a 211 and lens-c 213 may be different from one another.

Furthermore, when a plurality of lenses are arranged along a plurality of lines concavely formed on a spherical surface as illustrated in FIG. 2D(c), the transverse directional capture angles and longitudinal directional capture angles of all lenses may be different from one another. Accordingly, the controller 180 may capture a plurality of images captured at different angles, respectively, and the plurality of images may be used to synthesize a newly changed image based on the user's selection.

Similarly as illustrated in FIG. 2D, the plurality of lenses may be arranged along a plurality of lines formed on a convexly curved surface or spherical surface. FIG. 2E illustrates such an example.

Similarly to FIG. 2D, even when a plurality of lines are formed on a convex surface or spherical surface, capture angles at which a subject is captured through each lens may be different from one another. However, the capture angles of lenses, respectively, are converged toward a particular subject since a plurality of lenses are arranged in a concave shape in case of FIG. 2D, but on the contrary, the capture angles of lenses, respectively, are diverged toward a particular subject since a plurality of lenses are arranged in a convex shape in case of FIG. 2E.

The configuration arranged with a plurality of lenses as illustrated in FIGS. 2D and 2E merely illustrates an example of the lens arrangement of an array camera formed on a curved or spherical surface, but the present disclosure may not be necessarily limited to this. In other words, a plurality of lenses may be arranged in the array camera in various schemes that are not illustrated in FIGS. 2D and 2E, and the present disclosure may be also applicable to such cases.

Hereinafter, a method of generating a synthesized image using a plurality of images when a plurality of images are entered through a camera having the plurality of lenses will be described in more detail with reference to the accompanying drawings.

FIG. 3 is a flow chart for explaining a method of generating and displaying an image synthesized or changed using a plurality of images captured through a plurality of lenses in a mobile terminal according to an embodiment of the present disclosure. FIG. 4 is a conceptual view for explaining a method of generating and displaying an image illustrated in FIG. 3.

In a mobile terminal according to an embodiment of the present disclosure, the process of receiving an image (or image signal) through a plurality of lenses arranged on an array camera is carried out (S300). Here, the image may be received when a function for image capture is executed or the camera 121 is activated. The function for image capture may be executed when a camera related application is activated. Furthermore, the camera related application may be activated when an icon (or graphic object) of the camera related application displayed on the display unit 151 is selected.

Furthermore, when the function for image capture is executed (or camera 121 is activated), the controller 180 may receive an image through a plurality of all lenses or receive an image through at least one of the plurality of lenses during the activation of the camera 121 according to the camera related setting information. Hereinafter, an embodiment in which an image is received through a plurality of all lenses arranged on a camera will be primarily described.

On the other hand, as illustrated in the step S300, when an image is received through a plurality of lenses, the received images may be displayed in a preset arrangement on the display unit 151 (S302).

For example, when sixteen lenses are arranged on the camera 121, and images are received through the sixteen lenses, respectively, all the images entered through the sixteen lenses may be displayed as illustrated in FIG. 4A.

Here, the controller 180 may arrange the plurality of images to correspond to a location placed with lenses. For example, an image 410 entered through a sixteenth lens 211 may be displayed at a location corresponding to the sixteenth lens 211 among a plurality of lenses placed on the camera 121. In this manner, the controller 180 may place and display images received from lenses, respectively, on the display unit 151 to correspond to a location at which the each lens is placed. In other words, the images may be displayed on the display unit 151 according to a preset arrangement corresponding to an order in which the plurality of lenses are placed on the camera 121.

Accordingly, the controller 180 may partition the display unit 151 into a plurality of regions to correspond to the number of the plurality of lenses, and display any one of the images entered through the plurality of lenses for each of the plurality of regions. For example, when the number of lenses is sixteen as illustrated in FIG. 4A, the controller 180 may partition the display unit into sixteen regions, and display each image in the partitioned sixteen regions, respectively. Here, the different images may be images entered through different lenses, respectively.

On the other hand, during the step S302, images displayed on the display unit 151 may be preview images. Here, the "preview images" may be images merely entered through a plurality of lenses prior to receiving a capture request for capturing an image entered through the camera 121. In this case, the preview images may not be stored in the memory 160 until the capture request is received. Accordingly, the preview images may be changed according to a change of the focal point of the camera, and accordingly, an image displayed on the display unit 151 can be changed in real time.

In this manner, when a capture request is received in a state that images entered through a plurality of lenses are displayed on the display unit 151, images entered through a plurality of lenses may be captured in response to that request (S304). Here, "capture" denotes storing images entered through a camera (or lens) in the memory 160 at which the capture request is received or a time point corresponding to the time point.

Here, the controller 180 may store the images in the memory 160 in a preset order in the transverse or longitudinal direction. For example, for the memory 160, a storage space, namely, memory cell, with a preset size may be arranged as many as a preset number in the transverse or longitudinal direction to constitute a memory cell array. In this case, the controller 180 may store the plurality of images in the memory cells, respectively, corresponding to a preset order. Here, the preset order may be an order in which the plurality of lenses of the camera 121 are arranged or a reverse order thereof.

Furthermore, when storing images in the memory cells, respectively, the controller 180 may store the remaining portion of images excluding a common portion of the previously stored image but not one complete image. For example, when storing the images according to a preset order, the controller 180 may compare a currently stored image with an image that has not been stored yet to extract a different portion thereof, and store only the extracted different portion in the memory cell. In this case, the data size of images stored in the memory 160 can be greatly reduced.

Moreover, the store information of images captured through the plurality of lenses, namely, a direction, a sequence or a scheme in which the captured images are stored may be stored in metadata or the like, which is used in the Extensible Metadata Platform (XMP) standard.

On the other hand, when a capture request is received, the controller 180 may capture images entered through a plurality of lenses with a predetermined time interval. For example, the plurality of images may be captured with a time interval delayed by 0.1 second, respectively. Here, the time interval with which the images are captured may be changed according to the user's selection.

Furthermore, when the plurality of images are stored in the memory 160, the process of synthesizing the plurality of images into one extended image or synthesizing a newly changed image using at least two of the plurality of images may be carried out based on the user's selection (S306).

For example, the controller 180 may compare a plurality of images, respectively, on the display unit 151 as illustrated in FIG. 4A during the step S306 to distinguish a common and different portion thereof. In addition, the controller 180 may synthesize the different portions from the images, respectively, around the common portion to generate one extended image as illustrated in FIG. 4B.

Furthermore, during the step S306, the controller 180 may synthesize any one of the plurality of images with any other one based on the user's selection to generate a newly changed image. For example, the controller 180 may replace part of any one of the plurality of images as illustrated in FIG. 4C with part of the other image to synthesize a changed image as illustrated in FIG. 4D.

When a synthesized image is generated during the step S306, the controller 180 may display it on the display unit 151 (S308). The controller 180 may display the synthesized image in various ways. For example, the controller 180 may display a graphic object for displaying the number of the plurality of images around the synthesized image while displaying the synthesized image.

Otherwise, when there is a request of a camera-related application, such as "gallery", for displaying an image stored in the memory 160 on the display unit 151, the controller 180 may display the synthesized image in the form of a thumbnail as a representative image for the plurality of images. Otherwise, the controller 180 may divide the display unit 151 into a plurality of regions, and display the synthesized image in an enlarged manner in one region thereof, and display the plurality of images in another region. The plurality of images displayed in the another region may be displayed in a thumbnail format.

Otherwise, while displaying a newly changed image synthesized as a result of the step of S306, the controller 180 may display a graphic object for displaying information on images synthesized to generate the changed image around the changed image. For example, the controller 180 may display information on the capture angles of images synthesized to synthesize the changed image on the graphic object.

In other words, when part of any one of the plurality of images is replaced with part of an image corresponding to the user's gaze direction or the inclination direction of the mobile terminal 100 to generate the changed image, a graphic object for displaying the user's gaze direction or the inclination direction of the mobile terminal 100 may be displayed around the changed image.

Hereinafter, a method of displaying images entered through a plurality of lenses will be described in more detail with reference to the accompanying drawings. FIG. 5A is a conceptual view for explaining a method of displaying an image synthesized with a plurality of images in response to a user's selection when the user selects a representative image representing the plurality of images. Furthermore, FIG. 5B is a conceptual view for explaining a method of synthesizing a plurality of images into one extended image.

For example, when there is a request of a camera-related application, the controller 180 may display images stored in the memory 160 on the display unit 151 as illustrated in FIG. 5A(a). Here, when the camera 121 has a plurality of lenses, the controller 180 may display a thumbnail image 500 of a representative image representing a plurality of images entered through the plurality of lenses.

Here, the representative image may be an image captured through any one lens previously selected by the user prior to "capturing" the plurality of images. Otherwise, one extended image into which the different portions from the plurality of images, respectively, are synthesized around a common portion as described above may be the representative image. Otherwise, an image manipulated based on the user's selection among the plurality of images, for example, an image in which the contrast, sharpness, shade and the like are manipulated may be selected as the representative image. Here, a method of choosing the representative image will be described in more detail with reference to FIGS. 6A, 6B and 7.

Furthermore, as illustrated in FIG. 5A(a), when the user's touch input is sensed in a region displayed with the thumbnail image 500 of the representative image, the controller 180 may enlarge and display an image corresponding to the thumbnail image 500 on the display unit 151 in response to this.

For example, the controller 180 may enlarge and display any one of the plurality of images. Otherwise, the controller 180 may enlarge and display an image manipulated by the user on the display unit 151. Otherwise, the controller 180 may display an image synthesized with a plurality of images on the display unit 151.

FIG. 5A(b) illustrates an example in which an image synthesized with a plurality of images is displayed on the display unit 151. As described above, the synthesized image may be formed by synthesizing different portions from a plurality of images, respectively, around a common portion.

FIG. 5B is a conceptual view for explaining a method of synthesizing one extended image using a plurality of images.

For the sake of convenience of explanation, it is assumed that the number of lenses provided in the camera 121 is four. In this case, when the user captures a specific subject, for example, a "mansion" as illustrated in FIG. 5B, the four lenses may receive images as illustrated in FIGS. 5B(a), 5B(b), 5B(c) and 5B(d), respectively, and store them in the memory 160.

Furthermore, as illustrated in FIGS. 5B(a), 5B(b), 5B(c) and 5B(d), a common portion exists in images, respectively, captured through each lens. In this case, the controller 180 may distinguish a common and a different portion from the images, respectively (for example, FIGS. 5B(a), 5B(b), 5B(c) and 5B(d)).

Furthermore, the controller 180 may synthesize the different portions around a common portion. For example, when the controller 180 synthesizes them in the order of FIGS. 5B(a), 5B(b), 5B(c) and 5B(d), the remaining portions may be synthesized on the basis of a region 550a, 550b, 550c, 550d displayed with an image of the common portion from the images.

In other words, in case of an image illustrated in FIG. 5B(a), the remaining portion 552 excluding a common portion 550a may be used for the synthesis of an extended image. Furthermore, in case of an image illustrated in FIG. 5B(b), the remaining portion 554 excluding a common portion 550b and a portion 552a overlapped with FIG. 5B(a) may be used for the synthesis of an extended image. Furthermore, in case of an image illustrated in FIG. 5B(c), the remaining portion 556 excluding a common portion 550c and a portion 554a overlapped with FIG. 5B(b) may be used for the synthesis of an extended image. Furthermore, in case of an image illustrated in FIG. 5B(d), the remaining portion 558 excluding a common portion 550d and a portion 552a', 556a overlapped with FIGS. 5B(a) and 5B(c) may be used for the synthesis of an extended image.

Accordingly, different portions 552, 554, 556, 558 may be synthesized around the common portion 550a, 550b, 550c, 550d among images captured through lenses, respectively, to generate an extended synthesized image as illustrated in FIG. 5B(e).

Furthermore, according to the foregoing description, it is described that complete images illustrated in FIGS. 5B(a), 5B(b), 5B(c) and 5B(d) are stored, and the controller 180 synthesizes an image by distinguishing common and different portions from the stored images, but on the contrary, complete images may not be, of course, necessarily stored in the memory 160.

For example, when the images illustrated in FIGS. 5B(a), 5B(b), 5B(c) and 5B(d) are captured, assuming that the controller 180 stores the images in the order of FIGS. 5B(a), 5B(b), 5B(c) and 5B(d), the controller 180 may extract only differences between each image to store them in the memory 160.

In other words, if the image of FIG. 5B(a) is stored, then the controller 180 may store only a different portion 554 between the images of FIG. 5B(b) and FIG. 5B(a) in the memory 160 when storing the FIG. 5B(b). Furthermore, then the controller 180 may store only a different portion 556 between the images of FIG. 5B(b) and FIG. 5B(c) when storing the FIG. 5B(c). Furthermore, the controller 180 may store only a different portion 558 between the images of FIG. 5B(a) and FIG. 5B(c) when storing the FIG. 5B(d).

In this case, when synthesizing a portion illustrated in FIG. 5B(e), the controller 180 may synthesize different portions 554, 556, 558 between each image around a common portion 550a on the basis of FIG. 5B(a). Furthermore, when storing only such different portions, it may be possible to greatly save the storage space of the memory 160.

When such an extended image is synthesized, the controller 180 displays the synthesized image on the display unit 151. The controller 180 may display the synthesized image on the entire screen of the display unit 151 as illustrated in FIG. 5A(b). Otherwise, the controller 180 partitions the screen of the display unit 151 into a plurality of regions, and displays the synthesized image in any one region thereof, and display images entered through the plurality of lenses as images in a thumbnail format in another region thereof (not shown).

Furthermore, when the synthesized image is displayed on the display unit 151, the controller 180 may display graphic information for displaying the number of the plurality of images around the synthesized image. For example, the controller 180 may display a graphic object 502 indicating the number of a plurality of images as illustrated in FIG. 5A(b) or display another type of the corresponding graphic object. For example, the controller 180 may display a graphic object (for example, 4×4) indicating the arrangement form of the plurality of lenses to display the number of the plurality of images.

On the other hand, as illustrated in FIG. 5A(b), when the user's touch is sensed in a region displayed with the synthesized image, the controller 180 may display the plurality of images on the display unit 151. For example, when the synthesized image is selected, the controller 180 may partition the screen of the display unit 151 into a plurality of regions to correspond to the number of the plurality of lenses, and display any one of the plurality of images for each of the plurality of regions.

In the above, a method of synthesizing a plurality of images captured through a plurality of lenses to generate and display one extended image when the representative image 500 is selected, and display the plurality of images on the display unit 151 when the generated synthesized image is selected by the user has been described in detail with reference to the accompanying drawings.

Hereinafter, a method of choosing the representative image in a mobile terminal 100 provided with a plurality of lenses according to an embodiment of the present disclosure will be described in detail with reference to the accompanying drawings.

As described above, when there is a request of a camera-related application, the controller 180 may display summarized information on images stored in the memory 160 on the display unit 151. Here, the "summarized information" may be a thumbnail image of each image stored in the memory 160 or may be information on the capture time, image title, size or format of each image stored in the memory 160. Furthermore, the user may select any one image using the "summarized information", and the selected image may be displayed on the display unit 151 according to the operation setting of the camera-related application.

However, as described above, a mobile terminal 100 according to an embodiment of the present disclosure may have a plurality of lenses to store a plurality of images entered through a plurality of lenses, respectively. Furthermore, here the plurality of images may have one "summarized information." In other words, when the user selects "summarized information capable of representing the plurality of images, all the plurality of images may be displayed on the display unit 151.

For example, the "summarized information" may be a thumbnail image for an image representing the plurality of images. The representative image may be implemented in various forms. For example, the representative image may be an image captured through any one lens previously selected by the user from the plurality of lenses or any one image selected by the user from the plurality of images.

For example, the user may select any one of a plurality of images displayed on the display unit 151 as a representative image. In other words, when any one image (for example, sixth image 600) is selected from a plurality of images as illustrated in FIG. 6A(a), it may be chosen as a representative image. In this case, a guide image for guiding the image chosen as the representative image may be displayed around the chosen image 600.

Then, the controller 180 may generate a thumbnail image 602 for the image 600 chosen as the representative image when there is a request of a camera-related application. Furthermore, the controller 180 may display the generated thumbnail image 602 on the display unit 151 as illustrated in FIG. 6A(b).

On the other hand, according to the foregoing description, it is described that any one of previously stored images is chosen as a representative image, but on the contrary, non-stored images may be, of course, set to a representative image in advance.

In the above, in a mobile terminal 100 according to an embodiment of the present disclosure, it has been described that a preview image can be first displayed on the display unit 151 prior to capturing an image through the plurality of lenses, respectively. In this case, the user can check preview images entered through the plurality of lenses, respectively, and select any one of the preview images. In other words, the controller 180 may select a lens corresponding to the selected preview image selected by the user, and choose an image entered through the selected lens as the representative image.

Furthermore, the chosen representative image may be changed to another image according to the user's selection. For example, when there is a user's touch input in a region displayed with the thumbnail image 602 for the representative image, the controller 180 may display graphic objects 650a, 650b, 650c, 650d for selecting any one of the plurality of images captured through the plurality of lens around the thumbnail image 602 as illustrated in FIG. 6B(a).

Furthermore, when the user's input is sensed in a region displayed with any one of the graphic objects 650a, 650b, 650c, 650d, an image located in the sensed direction among the plurality of images may be chosen as the representative image.

For example, according to the foregoing description of FIG. 6A, if the user selects any one graphic object 650 when a sixth image 600 of the plurality of images is selected as a representative image, then an image 606 located in a direction corresponding to the user's input may be selected on the basis of the sixth image 600 as illustrated in FIG. 6B(c). Furthermore, the selected imager 606 is chosen as a representative image to generate a thumbnail image for the selected image 606, and the generated thumbnail image may be displayed on the display unit 151 as illustrated in FIG. 6B(c).

Moreover, as illustrated in FIGS. 6B(a) and 6B(c), graphic objects 652, 654 for displaying the identification number of the representative image and the number of a plurality of images based on a preset arrangement may be displayed on the thumbnail image. The graphic object may be one displaying only one identification number based on a preset arrangement order of the representative image, and may contain the total number of the plurality of images as illustrated in FIGS. 6B(a) and 6B(c).

Furthermore, according to the foregoing description, graphic objects with an arrow shape are illustrated for an example of the graphic objects 650a, 650b, 650c, 650d for selecting any one of the plurality of images, but another type of graphic objects may be, of course, displayed. For example, graphic objects in the form of a longitudinal or transverse directional scroll bar may be displayed instead of the graphic objects 650a, 650b, 650c, 650d. Furthermore, when the user's touch input is sensed in a region displayed with the scroll bar, the controller 180 may choose an image located in a direction corresponding to the user's touch input among a plurality of images as a representative image.

Moreover, an image containing all the plurality of images may be, of course, chosen as the representative image. For example, as illustrated in FIG. 7A, the screen of the display unit 151 containing all the plurality of images entered through a plurality of lenses of the mobile terminal 100 according to an embodiment of the present disclosure may be chosen as the representative image. Furthermore, in this case, as illustrated in FIG. 7B, a thumbnail image containing all the plurality of images may be displayed on the display unit 151.

Moreover, according to the foregoing description, one extended image synthesized using the plurality of images may be, of course, used as a representative image in the mobile terminal 100 according to an embodiment of the present disclosure. In this case, a thumbnail image for the synthesized image may be displayed in response to a camera-related application. Furthermore, a graphic object for displaying the number of a plurality of images may be displayed around the displayed thumbnail image as illustrated in FIG. 5A(b).

On the other hand, the camera 121 of the mobile terminal 100 according to an embodiment of the present disclosure has been described that a plurality of lenses can be arranged along a plurality of lines formed on a concavely curved surface or convexly curved surface as well as a plane surface. In this case, the capture angles of the plurality of lenses, respectively, are different from one another. In other words, when the plurality of lenses are arranged on a curved surface, images in which one subject is captured at different angles with one shot can be stored while capturing the subject.

In this case, the controller 180 may generate an image in which part of the existing image has been changed using the images captured at different angles based on the user's selection. For example, the controller 180 may select any one of a plurality of images captured at different angles by the user, and set a partial region of the selected image to a region subject to change based on the user's selection. Furthermore, an image in the region subject to change can be changed to an image different from the currently selected image, namely, part of an image captured at a different angle from that of the currently selected image.

FIG. 8 is a conceptual view for explaining a method of setting a partial region of an image currently displayed on the display unit 151 to a region subject to change based on the user's input in a mobile terminal according to an embodiment of the present disclosure.

Referring to FIG. 8, when a user's touch input is sensed in a region on the display unit 151 in which a particular subject image is displayed, the controller 180 may set a region displayed with the whole of the particular subject image 800 to the region subject to change as illustrated in FIG. 8A. Otherwise, when a user's touch-and-drag input dragged from a first position 802a to a second position 802b is sensed as illustrated in FIG. 8B, a region 800 corresponding to the touch-and-drag input may be set to the region subject to change.

Otherwise, a region of the display unit 151 may be divided into a plurality of regions 804, 806, and either one region 804 of the divided regions may be set to the region subject to change. FIG. 8C illustrates such an example.

Otherwise, only a partial region of a particular subject may be selected as the region subject to change. For example, as illustrated in FIG. 8D, only a partial region of a particular subject image corresponding to the user's touch input may be set to the region subject to change. When there is a user's touch input to the partial region or a user's touch-and-drag input to a circumference of the partial region, only the partial region may be recognized as the user's selected region.

In this manner, when any one partial region selected by the user from images captured through a plurality of lenses is set to the region subject to change, the controller 180 may replace an image in a portion set to the region subject to change with part of an image different from the user's selected image.

To this end, the controller 180 may extract images corresponding to an image in a portion set to the region subject to change from images different from the user's selected image among images captured through the plurality of lenses. Furthermore, the image in a portion set to the region subject may be replaced with any one image based on the user's selection among the extracted images to generate a new image in which part of the image is changed according to the user's selection.

FIGS. 9A and 9B are views illustrating such an example.

Referring to FIG. 9A(a), when part of an image displayed on the display unit 151 is set to the region subject to change 900, the controller 180 senses whether or not there is a user's touch input. Then, when there is the user's touch input, the controller 180 selects at least one of images captured through the plurality of lenses.

For example, when a user's touch input dragged in a transverse direction from a first position 902a to a second position 902b is sensed as illustrated in FIG. 9A(a), the controller 180 selects images located in the transverse direction on the basis of an image currently displayed on the display unit 151 among images captured through the plurality of lenses.

For example, images captured through the plurality of lenses may be ones arranged according to an order in which the plurality of lenses are arranged. Furthermore, the controller 180 may select images located in the transverse direction on the basis of an image currently displayed on the display unit 151. In addition, the controller 180 extracts images (hereinafter, referred to as images subject to synthesis) corresponding to the region subject to change 900 from the selected images.

In this manner, when the images subject to synthesis are extracted, the controller 180 may select any one of the extracted images subject to synthesis with the support of the user. To this end, the controller 180 may display a screen 904 for allowing the user to select any one of the extracted images subject to synthesis in at least one region of the display unit 151.

FIG. 9A(b) illustrates such an example.

The screen 904 may include thumbnail images 904*a*, 904*b*, 904*c*, 904*d*, 904*e* for at least one image subject to synthesis that is selectable by the user.

According to the foregoing description, it has been illustrated that a plurality of lenses provided in the camera 121 according to an embodiment of the present disclosure can be arranged on a curved surface. Furthermore, when the plurality of lenses are arranged on a curved surface, it has been described that at least one of the plurality of lenses can have a different capture angle from those of the other lenses.

Accordingly, images subject to synthesis corresponding to thumbnail images 904*a*, 904*b*, 904*c*, 904*d*, 904*e*, respectively, may be ones extracted from images captured at different angles, respectively. Consequently, the images subject to synthesis may be different images in which a subject corresponding to the region subject to change 900 is captured at different angles as illustrated in thumbnail images 904*a*, 904*b*, 904*c*, 904*d*, 904*e* in FIG. 9A(b).

Furthermore, the images subject to synthesis may be ones extracted from an image captured through a lens having a capture angle in a different transverse direction on the basis of an image displayed on the display unit 151. It is because a user's touch-and-drag input is sensed in the transverse direction as illustrated in FIG. 9A(a). In other words, the controller 180 may extract the images subject to synthesis from images located in a direction to which the user's touch is applied among images captured through the plurality of lenses on the basis of an image displayed on the display unit 151.

In addition, when any one of the thumbnail images 904*a*, 904*b*, 904*c*, 904*d*, 904*e* is selected by the user, the selected thumbnail image 904*e* may be displayed in a highlighted manner to be distinguished from the other images. For example, an image subject to synthesis selected by the user may be displayed in a different color from the other images subject to synthesis or displayed with a separate guide image for guiding a circumference of the selected image subject to synthesis.

Furthermore, the controller 180 may replace an image in a portion set to the region subject to change 900 with an image subject to synthesis corresponding to the selected thumbnail image 904*e*. Accordingly, as illustrated in FIG. 9A(b), an image displayed in the region subject to change 900 may be replaced with an image subject to synthesis 906 corresponding to the thumbnail image 904*e* selected by the user. Accordingly, as illustrated in FIG. 9A(b), a newly changed image in which only an image of the region subject to change 900 is replaced with part of another image may be generated.

In FIG. 9A, it has been described under the assumption that the user's touch input is in a transverse direction, but a newly changed image in which part of the image is changed may be, of course, generated using any one image based on the user's touch input direction even in case where the user's touch input is in a longitudinal direction.

FIG. 9B is a view illustrating such an example.

Referring to FIG. 9B, when a user's touch input dragged in a longitudinal direction from a first position 952*a* to a second position 952*b* is sensed, images located in the longitudinal direction may be selected from images captured through the plurality of lenses on the basis of an image currently displayed on the display unit 151.

For example, images captured through the plurality of lenses may be ones arranged according to an order in which the plurality of lenses are arranged. Furthermore, images located in a direction to which the user's touch is applied, namely, a longitudinal direction, on the basis of an image currently displayed on the display unit 151 may be selected based on the arrangement configuration. Furthermore, images corresponding to the region subject to change 900, namely, images subject to synthesis, may be extracted from the selected images.

Here, images subject to synthesis may be ones extracted from an image captured through a lens having a capture angle in a different longitudinal direction on the basis of an image displayed on the display unit 151. It is because a user's touch-and-drag input is sensed in the longitudinal direction as illustrated in FIG. 9B(a).

Furthermore, any one of the images subject to synthesis may be selected by the user. To this end, a screen 954 capable of allowing the user to select any one of the images subject to synthesis may be displayed in at least one region on the display unit 151.

FIG. 9B(b) illustrates such an example.

The screen 954 may include thumbnail images 954*a*, 954*b*, 954*c*, 954*d*, 954*e* corresponding to the extracted images subject to synthesis, respectively. Furthermore, any one of the thumbnail images 954*a*, 954*b*, 954*c*, 954*d*, 954*e* may be selected by the user. Furthermore, when any one thumbnail image is selected by the user, an image displayed in the region subject to change 900 may be replaced with an image subject to synthesis 956 corresponding to the selected thumbnail image. Accordingly, as illustrated in FIG. 9B(b), a newly changed image in which only the image of the region subject to change 900 is replaced with part of another image can be generated.

On the other hand, according to the foregoing description of FIGS. 9A(b) and 9B(b), it has been described that only thumbnail images for images subject to synthesis are displayed in at least one region on the display unit 151, but on the contrary, thumbnail images for images themselves, respectively, based on the user's touch input direction may be, of course, displayed in at least one region on the display unit 151. Furthermore, the user can, of course, select any one of the thumbnail images for images themselves to easily change an image currently displayed on the display unit 151.

In other words, the controller 180 may select images located in a direction to which the user's touch input is applied on the basis of an image currently displayed on the display unit 151 among images captured through the plurality of lenses. Furthermore, the controller 180 may generate thumbnail images for the selected images. Furthermore, the generated thumbnail images may be displayed in at least one region on the display unit 151.

For example, when the direction to which the user's touch input is applied is a transverse direction, the controller 180 may select images located in the transverse direction on the basis of an image currently displayed on the display unit 151 based on a configuration in which images captured through the plurality of lenses are arranged. Furthermore, the controller 180 may generate thumbnail images for the selected images, and display a screen 908 containing the generated thumbnail images in at least one region on the display unit 151 as illustrated in FIG. 9A(b).

Furthermore, when the direction to which the user's touch input is applied is a longitudinal direction, the controller 180 may select images located in the longitudinal direction on the basis of an image currently displayed on the display unit 151 based on a configuration arranged with images. Furthermore, the controller 180 may generate thumbnail images for the selected images, and display a screen 958 containing the generated thumbnail images in at least one region on the display unit 151 as illustrated in FIG. 9B(b).

Here, if any one of thumbnail images contained in the screens 908, 958 is selected by the user, then an image corresponding to the selected thumbnail image may be currently displayed on the display unit 151. Furthermore, a region corresponding to the region subject to change 900 may be set to part of an image currently displayed on the display unit 151. Furthermore, an image in the region corresponding to the region subject to change 900 may be replaced with any one part of an image based on a direction to which the user's touch input is applied as illustrated in FIGS. 9A and 9B.

On the other hand, according to the foregoing description, it has been described that a screen capable of selecting any one image subject to synthesis based on a direction to which the user's touch input is applied is displayed on the display unit 151, and the any one image subject to synthesis is selected by the user. However, on the contrary, when there is a jog key, four-direction key or a user's touch input corresponding to that, an image of the region subject to change 900 can be, of course, replaced with part of any one image corresponding to the user's input among images captured through the plurality of lenses.

FIG. 10 illustrates such an example.

First, referring to FIG. 10A, the controller 180 may sense whether or not there is a jog key, four-direction key or a user's touch input corresponding to that. For example, as illustrated in FIG. 10A, when a user's touch input is sensed in any one of regions 1000*a*, 1000*b*, 1000*c*, 1000*d* located around each edge on the display unit 151, the controller 180 can recognize that there is a user's direction signal input in a particular direction.

Furthermore, when the user's direction signal input in a particular direction is recognized, the controller 180 may select any one image subject to synthesis corresponding to the user's direction signal input. For example, when the region subject to change 900 is set as illustrated in FIG. 9A(a), the controller 180 may extract an image subject to synthesis corresponding to the region subject to change 900 from images located in a transverse or longitudinal direction on the basis of an image currently displayed on the display unit 151. Here, images located in a transverse or longitudinal direction may refer to images located in a transverse or longitudinal direction on the basis of an image currently displayed on the display unit 151 based on a configuration in which images captured through the plurality of lenses are arranged (for example, a configuration arranged to correspond to an order in which the plurality of lenses are arranged).

FIG. 10B illustrates an example in which the images captured through the plurality of lenses are arranged according to an order in which the plurality of lenses are arranged. For the sake of convenience of explanation, in FIG. 10B, images of a portion corresponding to the region subject to change 900, namely, images subject to synthesis, are displayed instead of images captured through the plurality of lenses.

Referring to FIG. 10B, when the image currently displayed on the display unit 151 is an image 1010 captured through a thirteenth lens among the plurality of lenses, images corresponding to an image displayed in the region subject to change 900, namely, images subject to synthesis, can be extracted from images 1020 located in a longitudinal direction or images 1030 located in a transverse direction on the basis of the image 1010 captured through a thirteenth lens.

The controller 180 may select any one image subject to synthesis corresponding to the user's input from the images subject to synthesis. In other words, when a user's touch input is sensed in any one of regions 1000*a*, 1000*b* in a longitudinal direction, the controller 180 may select any one of images 1020 located in a longitudinal direction, and extract an image subject to synthesis from the selected image.

Here, in order to display an image of the region subject to change on the display unit 151 as if it is changed based on a direction signal entered by the user, the controller 180 may select an image in an opposite direction to the direction signal entered by the user.

In other words, as illustrated in FIG. 10A, when a user's touch input is sensed in one region 1000*d* in the downward direction, the controller 180 can recognize that the user has entered a direction signal in the downward direction. In this case, the controller 180 may select an image captured through a lens (eighth or third lens) having a higher capture angle in an opposite direction to the direction signal entered by the user, namely, in a longitudinal direction than that of the lens that has captured the image 1010 currently displayed on the display unit 151. Here, an image captured through a lens having a capture angle in a higher longitudinal direction refers to an image in which the same subject is captured at a higher location.

Accordingly, when the image 1010 captured through the thirteenth lens is an image in which the face of the subject looks at the front side, an image 1024 or 1022 captured through the eighth or third lens, which is an image in which the "face of the subject" looks in the downward direction of the mobile terminal 100, can be selected.

Furthermore, the image subject to synthesis may be extracted from any one of the selected images 1024, 1022. Then, an image displayed in the region subject to change 900 may be replaced with the image subject to synthesis. Therefore, on the display unit 151 of the mobile terminal 100 according to an embodiment of the present disclosure, as illustrated in FIG. 10C, a screen in which the direction of a subject face in an image currently displayed on the display unit 151 is displayed as if it is changed based on a direction signal entered by the user's key input or touch input may be displayed.

Furthermore, the third lens is a lens having a capture angle in a higher longitudinal direction than that of the eighth lens. Accordingly, when the user touches one region 1000*d* in the downward direction once or touches the one region 1000*d* for less than a preset period of time, an image 1024 captured through the eighth lens may be selected. Then, the image subject to synthesis may be extracted from the image 1024 captured through the eighth lens.

However, when the user touches one region 1000*d* in the downward direction once more or touches the one region 1000*d* for greater than a preset period of time, an image 1022 captured through the third lens may be selected to extract an image subject to synthesis from that image.

Furthermore, an image displayed in the region subject to change 900 may be replaced with an image subject to synthesis extracted from the image 1024 or 1022 captured through the eighth or third lens. Accordingly, on the display unit 151 of the mobile terminal 100 according to an embodiment of the present disclosure, a screen in which the direction of the subject face of an image currently displayed on the display unit 151 is changed according to the user's input frequency or input time.

Furthermore, when the user's input is sensed in any one of input regions 1000c, 1000b in a transverse direction, the controller 180 may select any one of images 1030 located in the transverse direction, and extract an image subject to synthesis from the selected image.

Here, when the user's input is sensed in one region 1000b in the right direction, the controller 180 may recognize that the user has entered a direction signal in the right direction. In this case, the controller 180 may select an image located in an opposite direction to the user's entered direction signal, namely, an image 1032 captured through the twelfth lens. Furthermore, an image corresponding to the image displayed in the region subject to change 900, namely, an image subject to synthesis, may be extracted from the image 1032 captured through the twelfth lens. Then, the image displayed in the region subject to change 900 may be replaced with the extracted image subject to synthesis.

Here, the twelfth lens is a lens having a capture angle in a horizontal direction inclined to the left side than that of the lens that has captured the image 1010 currently displayed on the display unit 151. Accordingly, when the image 1010 captured through the thirteenth lens is an image in which the face of the subject looks at the front side, if the user's input is sensed in one region 1000d in the right direction, then an image in which the subject is captured in the left direction, namely, an image in which the "face of the subject" looks in the right direction, may be displayed on the display unit 151.

On the contrary, when the user's input is sensed in one region 1000c in the left direction, the controller 180 may recognize that the user has entered a direction signal in the left direction. Then, the controller 180 may select an image located in an opposite direction to the user's entered direction signal, namely, an image 1034 captured through the fourteenth lens. Furthermore, an image corresponding to the image displayed in the region subject to change 900, namely, an image subject to synthesis, may be extracted from the image 1034 captured through the fourteenth lens. Then, the image displayed in the region subject to change 900 may be replaced with the extracted image subject to synthesis.

Here, the fourteenth lens is a lens having a capture angle in a horizontal direction inclined to the right side than that of the lens that has captured the image 1010 currently displayed on the display unit 151. Accordingly, when the image 1010 captured through the thirteenth lens is an image in which the face of the subject looks at the front side, if the user's input is sensed in one region 1000d in the left direction, then an image in which the subject is captured in the right direction, namely, an image in which the face of the subject looks in the left direction, may be displayed on the display unit 151.

According to the foregoing description, it has been described under the assumption that the user touches any one of regions 1000a, 1000b, 1000c, 1000d, but on the contrary, the user can, of course, enter a direction signal through a specific key, for example, a jog key, four-direction key or the like.

On the other hand, according to the foregoing description, a method of allowing the user to directly select an image subject to synthesis for replacing an image in a portion set to the region subject to change or extracting an image subject to synthesis from an image selected according to a particular direction recognized based on the user's input has been described in detail with reference to the accompanying drawings.

However, on the contrary, the user can select any one of images captured through the plurality of lenses and extract an image subject to synthesis even when the user does not directly apply an input in a particular direction.

For example, the sensing unit 140 according to an embodiment of the present disclosure may include at least one or more sensors capable of sensing a direction in which the user's gaze or the mobile terminal 100 is inclined. Furthermore, the gaze sensing result of the sensing unit 140 or a result of sensing an inclined state of the mobile terminal 100 may be used to select any one of images captured through the plurality of lenses.

For example, when a region subject to change is set to part of an image currently displayed on the display unit 151, the controller 180 may sense the user's gaze direction through the sensing unit 140. Furthermore, the controller 180 can select an image captured through any one lens having a capture angle corresponding to the user's gaze direction among a plurality of lenses.

Here, the capture angle corresponding to the user's gaze direction may be a capture angle in an opposite direction to the user's gaze direction. For example, when the user's gaze direction is an angle in a transverse direction inclined at 30 degrees to the right side around the front side of the camera 121, the capture angle corresponding to the user's gaze direction may be an angle in a transverse direction inclined at 30 degrees to the left side around the front side.

Furthermore, the controller 180 may extract an image in a portion corresponding to a portion set to the region subject to change as an image subject to synthesis from the selected image. Furthermore, the controller 180 may replace an image in a portion currently set to a region subject to change on the display unit 151 with the extracted image subject to synthesis to generate a new image.

In this case, the controller 180 may display a graphic object for displaying the user's gaze direction sensed by the sensing unit 140 in at least one region of the display unit 151 while displaying the new image on the display unit 151.

FIG. 11A is a view illustrating such an example. As illustrated in FIG. 11A, when part of an image is replaced with part of an image selected based on the user's gaze direction, a graphic object 1100 shown in FIG. 11A may be displayed.

Here, the graphic object 1100 may be implemented in various shaped according to the user's gaze direction. For example, when the user's gaze direction faces the front side, a graphic object as illustrated in FIG. 11B may be displayed. Otherwise, the user's gaze direction sensed by the sensing unit 140 is in the top, bottom, left or right direction, graphic objects as illustrated in FIGS. 11C, 11D, 11E and 11F may be displayed. Furthermore, though not shown in the drawing, even when the recognized user's gaze direction is in a diagonal direction as well as in the top, bottom, left or right direction, a graphic object indicating the diagonal direction using the pupil's direction may be, of course, displayed in at least one region on the display unit 151 similarly to FIGS. 11C, 11D, 11E and 11F.

Furthermore, though not shown in the drawing, similarly to displaying the user's gaze direction in FIG. 11, a graphic object for displaying an inclined state of the mobile terminal 100 may be, of course, displayed on the display unit 151.

For example, when a region subject to change is set to part of an image currently displayed on the display unit 151, the controller 180 may sense the inclined state and the like of the mobile terminal 100 through the sensing unit 140. Furthermore, the controller 180 may select an image captured through any one lens having a capture angle corresponding to the inclined direction of the mobile terminal 100 among the plurality of lenses. Here, the capture angle corresponding to the inclined direction of the mobile terminal 100 may be a capture angle in an opposite direction to the inclined direction of the mobile terminal 100 similarly to a capture angle corresponding to the user's gaze direction.

Furthermore, the controller 180 may extract an image subject to synthesis from the selected image, and replace an image in a portion set to the region subject to change with the image subject to synthesis to generate a new image. Furthermore, the controller 180 may display a graphic object for displaying an inclined direction of the mobile terminal 100 in at least one region on the display unit 151 displaying the new image.

On the other hand, referring to FIG. 11, a separate graphic object is displayed on the display unit 151 to display the sensed user's gaze direction or inclined direction of the mobile terminal 100. However, the sensed user's gaze direction or inclined direction of the mobile terminal 100 may be, of course, displayed through various methods in addition to a method of using a separate graphic object.

For example, the controller 180 may distort an image according to the user's gaze direction to display the user's gaze direction or the inclined direction of the mobile terminal 100.

FIG. 12 illustrates such an example.

Referring to FIG. 12, the controller 180 may sense the user's gaze direction, the inclined direction of the mobile terminal 100 or the like through the sensing unit 140. Furthermore, the controller 180 may distort an image displayed currently displayed on the display unit 151 based on the user's gaze direction or the inclined direction of the mobile terminal 100. For example, the controller 180 may distort an image currently displayed on the display unit 151 to be bent in a direction corresponding to the user's gaze direction or the inclined direction of the mobile terminal 100.

FIGS. 12A, 12B, 12C and 12D illustrate such an example. First, assuming a case where an image is distorted according to the user's gaze direction, FIG. 12A assumes a case where the user's gaze direction looks at the left side to the right side, and FIG. 12B assumes a case where the user's gaze direction looks at the right side to the left side. Furthermore, FIG. 12C assumes a case where the user's gaze direction looks at the top side to the bottom side, and FIG. 12D assumes a case where the user's gaze direction looks at the bottom side to the top side.

As illustrated in FIGS. 12A, 12B, 12C and 12D, a distorted image that is bent according to the user's gaze direction may be displayed on the display unit 151 of the mobile terminal 100 according to an embodiment of the present disclosure. Furthermore, the distortion level may be determined according to the recognized user's gaze direction. For example, the controller 180 may determine the level of distortion according to an angle formed by the user's gaze direction around the front side of the camera 121. Accordingly, the user can recognize his or her own gaze direction and an angle thereof through the shape of an image currently displayed on the display unit 151 without a separate graphic object.

Similarly, an image can be, of course, distorted according to the inclined direction of the mobile terminal 100. In this case, FIG. 12C assumes a case where the capture direction of the camera faces from the top to the bottom as the mobile terminal 100 is inclined toward the front side. In this case, FIG. 12C assumes a case where the capture direction of the camera faces from the top to the bottom as the mobile terminal 100 is inclined to the front side, and FIG. 12D assumes a case where the subject capture direction of the camera faces from the bottom to the top as the mobile terminal 100 is inclined to the rear side. Furthermore, FIGS. 12A and 12B assume a case where the subject capture direction of the camera faces from the left to the right direction (FIG. 12A) or from the right to the left direction (FIG. 12B) as the mobile terminal 100 is inclined to the left or right side.

Accordingly, as illustrated in FIGS. 12A, 12B, 12C and 12D, a distorted image that is bent according to the subject capture direction changed by the inclination of the mobile terminal 100 may be displayed on the display unit 151 of the mobile terminal 100 according to an embodiment of the present disclosure. Furthermore, the level of distortion may be determined according to the inclined level of the mobile terminal 100 sensed by the sensing unit 140. Accordingly, the user can recognize the inclined direction of the mobile terminal 100 and a level thereof through the shape of an image currently displayed on the display unit 151 without a separate graphic object.

On the other hand, the examples illustrated in FIGS. 11 and 12 can be, of course, used to display at which angle the user is currently looking at an image as well as a synthesized image.

As described above, a plurality of lenses having different angles may be provided in the camera 121 of the mobile terminal 100 according to an embodiment of the present disclosure. Furthermore, a plurality of images captured through the plurality of lenses, respectively, have different capture angles, respectively.

Accordingly, when any one image of the plurality of images is displayed on the display unit 151, the controller 180 may display through which lens and at which capture angle the image currently displayed on the display unit 151 has been captured.

In other words, when an image captured through any one of the plurality of lenses is displayed on the display unit 151, the controller 180 may display a graphic image as illustrated in FIG. 11 in at least one region on the display unit 151 to correspond to a capture angle of a lens that has captured the image displayed on the display unit 151. Otherwise, the controller 180 can display, of course, an image displayed on the display unit 151 in a distorted manner based on the capture angle of the any one lens as illustrated in FIG. 12.

Moreover, an image displayed on the display unit 151 can be, of course, determined using a result sensed by the sensing unit 140. In other words, the controller 180 may display an image captured through a lens having a capture angle corresponding to the user's gaze direction or the inclined level of the mobile terminal 100 recognized through the sensing unit 140 among the plurality of lenses on the display unit 151. Furthermore, in this case, the capture angle may be displayed in the distorted form of a separate graphic image or an image displayed on the display unit 151.

Furthermore, according to an embodiment disclosed in the present disclosure, the foregoing method may be implemented as codes readable by a processor on a medium written by a program. Examples of the processor-readable media may include ROM, RAM, CD-ROM, magnetic tape, floppy disk, and optical data storage device, and the like, and also include a device implemented in the form of a carrier wave (for example, transmission via the Internet).

On the other hand, the foregoing description of the present disclosure has described a specific embodiment, but various modifications can be implemented without departing from the scope of the present disclosure. Furthermore, it will be apparent to those skilled in this art that various changes and modifications may be made thereto without departing from the gist of the present invention. Accordingly, it should be noted that the embodiments disclosed in the present invention are only illustrative and not limitative to the concept of the present invention, and the scope of the concept of the invention is not limited by those embodiments. The scope protected by the present invention should be construed by the accompanying claims, and all the concept within the equivalent scope of the invention should be construed to be included in the scope of the right of the present invention.

The invention claimed is:

1. A mobile terminal, comprising:
   a display unit;
   a camera arranged with a plurality of lenses along a plurality of lines; and
   a controller configured to:
     capture images entered through the plurality of lenses, and display a first image on the display unit among a plurality of captured images;
     change at least one region of the first image to at least part of an image different from the first image among the plurality of images based on a user's selection;
     extract images subject to synthesis corresponding to an image displayed in one region of the first image from the plurality of images, respectively, when one region of the first image is selected; and
     synthesize any one of the images subject to synthesis based on the user's selection with an image of a remaining portion of the first image excluding the one region,
   wherein the any one of the images subject to synthesis based on the user's selection is determined based on a touch direction of a touch input applied to the one region of the first image.

2. The mobile terminal of claim 1, wherein images subject to synthesis corresponding to an image displayed in one region of the first image, extracted from the plurality of images, respectively, are displayed in one region of the display unit, and
   the controller synthesizes an image subject to synthesis selected by the user among the displayed images subject to synthesis with the first image.

3. The mobile terminal of claim 1, wherein when a touch in a first direction is applied to the one region, a first image subject to synthesis corresponding to an image located in the first direction among the plurality of images on the basis of the first image is synthesized with the first image, and
   when a touch in a second direction which is different from the first direction is applied to the one region, a second image subject to synthesis corresponding to an image located in the second direction among the plurality of images on the basis of the first image is synthesized with the first image.

4. The mobile terminal of claim 3, wherein the display unit is partitioned into a first region in which the first image is displayed and a second region in which at least some thumbnail images of the plurality of images are displayed, and
   the second region comprises a thumbnail image of the image subject to synthesis to be synthesized with the first image.

5. The mobile terminal of claim 4, wherein the controller displays the thumbnail image of the image subject to synthesis in a highlighted manner to be distinguished from the other thumbnail images contained in the second region.

6. The mobile terminal of claim 1, wherein at least one of the plurality of lenses is arranged to have a different capture angle from the other one thereof.

7. The mobile terminal of claim 6, further comprising:
   a sensing unit configured to sense the direction of the user's gaze,
   wherein when a first region of the first image is selected, the controller changes the first region to part of an image captured through a lens corresponding to the user's gaze direction among the plurality of images.

8. The mobile terminal of claim 7, wherein when the gaze direction is changed, the controller changes the first region to part of an image captured through a lens corresponding to the changed gaze direction among the plurality of images.

9. The mobile terminal of claim 6, further comprising:
   a sensing unit configured to sense the inclination of the mobile terminal,
   wherein when a first region of the first image is selected, the controller changes the first region to part of an image captured through a lens having a capture angle corresponding to an inclined angle of the mobile terminal.

10. The mobile terminal of claim 9, wherein when an inclined angle of the mobile terminal is changed, the controller changes the first region to part of an image captured through a lens corresponding to the changed angle among the plurality of images.

11. A mobile terminal, comprising:
    a display unit;
    a camera arranged with a plurality of lenses along a plurality of lines; and
    a controller configured to:
      capture images entered through the plurality of lenses, and generate one extended image with the plurality of captured images; and
      generate the extended image using different portions of image regions of the plurality of images, respectively, around a common portion of image region of the plurality of images,
    wherein when a synthesized image is selected, the controller partitions the display unit into a plurality of regions to correspond to a number of the plurality of lenses, and displays any one of the plurality of images for each of the plurality of regions, and
    wherein when an image displayed in any one of the plurality of regions is selected, the controller enlarges the selected image to display the enlarged image on the display unit, and displays a graphic object containing unique information of a lens that has captured the selected image around the selected image.

12. The mobile terminal of claim 11, wherein the controller displays a number of the plurality of images around the extended image.

13. The mobile terminal of claim 11, wherein when a user's touch input to the selected image is sensed, the controller changes the selected image to an image determined based on the user's touch input among the plurality of images.

14. A control method of a mobile terminal having a camera arranged with a plurality of lenses, the method comprising:
    capturing a plurality of images entered from the plurality of lenses;
    determining any one of the plurality of images as a first image, and generating a synthesized image using at least one of the plurality of images on the basis of the first image; and displaying at least one of the captured images or the synthesized image on a display unit of the mobile terminal,
wherein said generating the synthesized image is generating a synthesized image in which part of the first image is replaced with part of any one of the plurality of images excluding the first image.

* * * * *